United States Patent
Zinser et al.

(10) Patent No.: US 11,174,955 B2
(45) Date of Patent: Nov. 16, 2021

(54) DIVERTER VALVE FOR CONVEYING A MATERIAL AND METHOD FOR CLEANING THEREOF

(71) Applicant: Coperion GmbH, Stuttgart (DE)

(72) Inventors: Bruno Zinser, Waldburg (DE);
Manfred Schädler, Ravensburg (DE);
Martin Stephan, Bergartreute (DE)

(73) Assignee: Coperion GmbH, Stuttgart (DE)

(*) Notice: Subject to any disclaimer, the term of this patent is extended or adjusted under 35 U.S.C. 154(b) by 105 days.

(21) Appl. No.: 16/155,948

(22) Filed: Oct. 10, 2018

(65) Prior Publication Data
US 2019/0107215 A1 Apr. 11, 2019

(30) Foreign Application Priority Data
Oct. 10, 2017 (DE) .................. 10 2017 218 031.5

(51) Int. Cl.
*F16K 11/083* (2006.01)
*B65G 53/56* (2006.01)

(52) U.S. Cl.
CPC .......... *F16K 11/0833* (2013.01); *B65G 53/56* (2013.01)

(58) Field of Classification Search
CPC .. F16K 11/0833; F16K 5/0278; F16K 27/062; F16K 1/24; B65G 53/56; Y10T 137/4245; Y10T 137/4336; Y10T 137/4343; Y10T 137/4351; Y10T 37/4245;
(Continued)

(56) References Cited

U.S. PATENT DOCUMENTS

| | | | |
|---|---|---|---|
| 862,143 A | * | 8/1907 | Duffy ..................... F16K 5/162 251/164 |
| 1,329,016 A | | 1/1920 | Renkin |
| 1,725,337 A | | 8/1929 | Burkhard |

(Continued)

FOREIGN PATENT DOCUMENTS

| | | |
|---|---|---|
| CN | 106659879 A | 5/2017 |
| CN | 107073253 A | 8/2017 |

(Continued)

OTHER PUBLICATIONS

Machine Translation of DE102005061432, retrieved May 13, 2021 (Year: 2005).*

(Continued)

*Primary Examiner* — Michael R Reid
(74) *Attorney, Agent, or Firm* — Smartpat PLC

(57) ABSTRACT

A diverter valve for conveying a material has a housing with at least three passage openings for feeding or discharging material. The passage openings define a conveying plane. The diverter valve includes a rotary part with an outer contour that is conical, at least in sections, with respect to its axis of rotation. The rotary part is arranged in a sealed manner in the housing. The rotary part can be axially displaced and rotated within the housing. The axis of rotation is perpendicular to the conveying plane. A passage conduit is arranged in the rotary part, which, depending on the rotational position of the rotary part, connects to each other two passage openings for conveying material along the passage conduit through the diverter valve. A drain opening is provided in the housing for the automatic drainage of a liquid from the housing.

20 Claims, 33 Drawing Sheets

(58) Field of Classification Search
CPC ............. Y10T 37/4336; Y10T 37/4343; Y10T 37/4351
USPC .............. 251/184; 137/238, 244, 245, 245.5
See application file for complete search history.

(56) References Cited

U.S. PATENT DOCUMENTS

| | | | | |
|---|---|---|---|---|
| 1,981,611 | A | * | 11/1934 | Cappa .................... B08B 9/0323 137/212 |
| 2,123,655 | A | * | 7/1938 | McDougal .......... F16K 11/0833 137/625.22 |
| 3,687,416 | A | * | 8/1972 | Mueller ................ F16K 5/0278 251/164 |
| 3,720,233 | A | | 3/1973 | Shur et al. |
| 4,385,746 | A | * | 5/1983 | Tomlin ...................... F16K 5/16 137/625.43 |
| 4,436,280 | A | * | 3/1984 | Geisow ................... F16K 5/162 251/14 |
| 5,072,758 | A | | 12/1991 | Krambrock |
| 8,074,686 | B2 | * | 12/2011 | Wolfram ............... F16L 23/024 138/109 |
| 2017/0246443 | A1 | | 8/2017 | Törnblom |

FOREIGN PATENT DOCUMENTS

| | | |
|---|---|---|
| DE | 355796 C | 7/1922 |
| DE | 2104098 A1 | 3/1972 |
| DE | 3922240 A1 | 1/1991 |
| DE | 10219989 | 1/2004 |
| DE | 102005061432 A1 | 7/2007 |
| EP | 0994050 B1 | 3/2007 |
| EP | 2332869 B1 | 7/2012 |
| FR | 1592242 A | 5/1970 |
| WO | 2016037646 A1 | 3/2016 |

OTHER PUBLICATIONS

The China National Intellectual Property Administration, Office Action in related application CN2018111747986; dated Oct. 9, 2019.

* cited by examiner

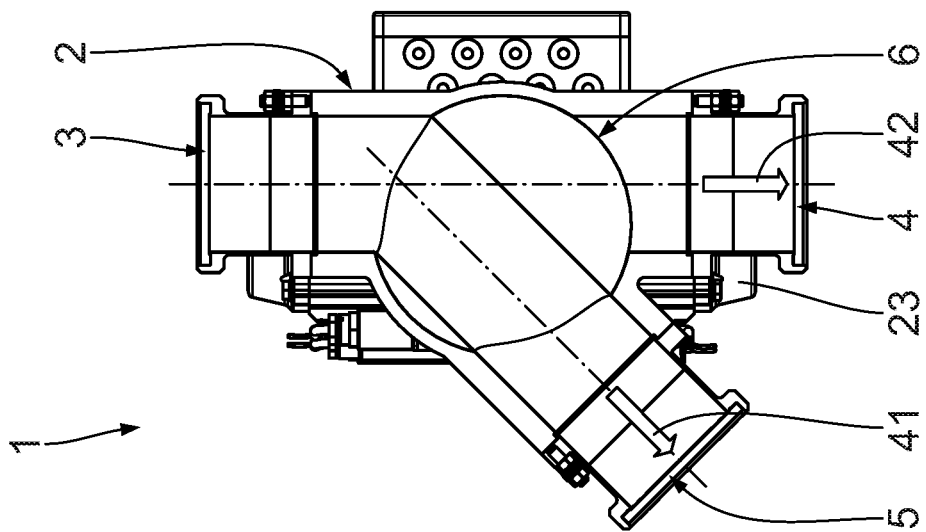
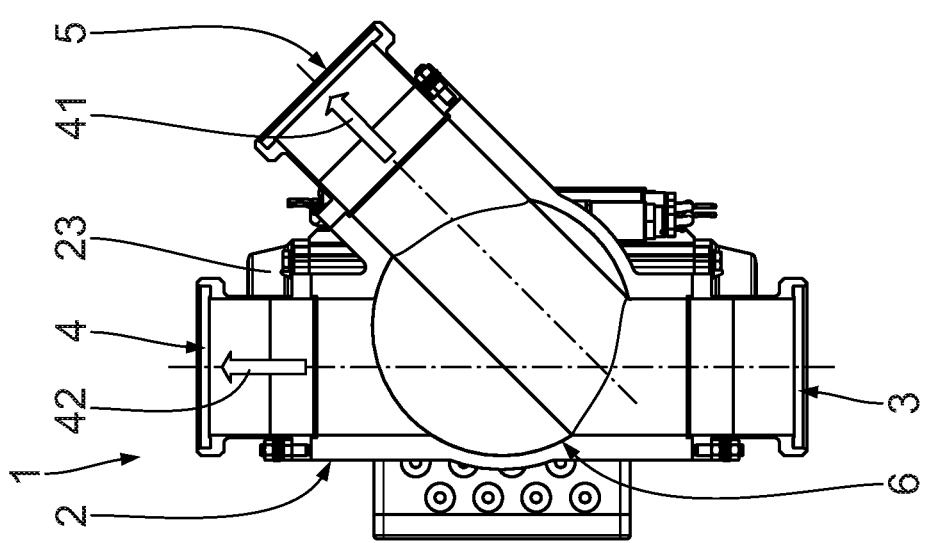

DIVERTER VALVE FOR CONVEYING A MATERIAL AND METHOD FOR CLEANING THEREOF

TECHNICAL FIELD

The disclosure relates to a diverter valve for conveying a material and a method for cleaning such a diverter valve.

BACKGROUND

DE 2 104 098 A discloses an equalizing valve.

DE 10 2005 061 432 A1 discloses a diverter with a rotary plug, which can be displaced between a conveying position and a cleaning position in a housing. The axis of rotation of the plug is arranged in the conveying plane of the pipe diverter valve. The pipe diverter valve can be cleaned with a rinsing liquid, without the plug having to be removed from the housing. The pipe diverter valve enables so-called "cleaning-in-place" (CIP). Based on the arrangement of the plug between the passage and the outlet, a comparatively small cone angle of the plug arises; this leads to a plug that is constructed to be comparatively lengthy. Between the plug that is constructed to be lengthy and the housing of the pipe diverter valve, a long gap, the sealing of which in the conveying position can be problematic, arises.

A conveying pipe diverter valve with a housing and a rotary plug rotatably mounted therein is known from EP 2 332 869 B1. The conveying pipe diverter valve enables CIP cleaning. In order to enable the CIP cleaning, a complex design of the rotary plug and the housing of the conveying pipe diverter valve is required to ensure a rinsing gap circulating in all spatial directions between the rotary plug and the housing. The CIP cleaning with the conveying pipe diverter valve is error-prone.

Design guidelines for bulk material handling under hygienic conditions are described in the EHEDG Guidelines Document 22 (General hygienic design criteria for the safe processing of dry particulate material, second edition, March 2014) and Document 41 (Hygienic engineering of diverter valves in process line for dry particulate material, August 2011).

An object of this disclosure is to provide a diverter valve for the conveyance of material to be conveyed, which ensures a stable conveyance of material to be conveyed and ensures reliable CIP cleaning.

SUMMARY

This object is accomplished by a diverter valve which has a housing with at least three passage openings for feeding or discharging a material to be conveyed. The passage openings define a conveying plane. The diverter valve also includes a rotary part having an axis of rotation and an outer contour that is conical, at least in sections, with respect to the axis of rotation. The rotary part is arranged in a sealed manner in the housing. The rotary part is displaceable along the axis of rotation in an axially driven manner and is rotatable around the axis of rotation in a rotatably driven manner. The axis of rotation is oriented perpendicular to the conveying plane. A passage conduit is arranged in the rotary part which, depending on a rotational position of the rotary part, connects to each other two passage openings for conveying material along the passage conduit through the diverter valve. The diverter valve further includes a drain opening in the housing for automatic drainage of a liquid from the housing.

The object is further accomplished by a method of cleaning the described diverter valve which includes:
ending conveyance of a material to be conveyed;
initiating a cleaning process;
pulling the rotary part of the diverter valve along the axis of rotation axially within the housing;
introducing a cleaning liquid through at least one of the passage openings;
rotating the rotary part around the axis of rotation while introducing the cleaning liquid;
ending the introduction of the cleaning liquid;
removing the cleaning liquid from the diverter valve;
drying the diverter valve by introducing hot gas;
ending the drying process; and
continuing conveyance of the material to be conveyed.

In the case of a diverter valve with a rotary part that is designed to be conical at least in sections, a defined rinsing gap can be produced between the rotary part and a housing by axially displacing the rotary part along its axis of rotation in the housing. For example, an axial displacement of the rotary part along the axis of rotation by approximately 10 mm effects a sufficiently large rinsing gap. The rinsing gap is defined as the vertical distance between the inside of the housing and an outer side of the rotary part. The outer side of the rotary part can be defined by the outer contour of the rotary part or a sealing element projecting thereon. Due to the axial displacement of the rotary part, the diverter valve can be displaced between a conveying position and a cleaning position.

In particular, the rinsing gap is set in such a manner that it is ensured that a supplied rinsing liquid moistens and flows around (thus, cleans) all areas of the interior of the housing and of the rotary part. In addition, the diverter valve has a drain opening in the housing, such that the cleaning liquid can automatically (due to gravity) drain from the housing. The diverter valve meets the requirements for CIP cleaning. Given that the rinsing gap is actively generated, reliable cleaning is ensured. The rinsing gap can be set in a range from 0.5 mm to 4 mm, in particular in a range between 1.0 mm and 3.0 mm and in particular between 1.5 mm and 2.0 mm. The rinsing gap is sufficiently large to ensure disruption-free rinsing and cleaning of the diverter valve. Disruptions as a result of an insufficient and/or uncontrolled and blocked rinsing gap are ruled out. The housing has at least three passage openings for feeding or discharging the material to be conveyed, whereas the passage openings define a conveying plane. The axis of rotation of the rotary part is oriented perpendicular to the conveying plane. This makes it possible to divide the rotation of the rotary part, on the one hand, and the axial displacement of the rotary part, on the other hand, on two separate drives. The two drives can be arranged in the axial direction of the axis of rotation opposite to the rotary part. As a result, it is possible to separate the functions of the drives. It is also possible to pivotally support the rotary part on both sides with respect to the axis of rotation. As a result, the guidance of the rotational movement of the rotary part is improved; in particular, it is more precise. This makes it possible to set a radial gap between the rotary part and the housing in the conveying position of 0.01 mm to 0.5 mm. Compared to a pipe diverter valve according to DE 10 2005 061 432 A1, with which the drive axis of the plug is located in the conveying plane, a larger cone angle for the design of the rotary part is possible. This results in advantages in the sealing of the rotary part in the housing.

According to a particular embodiment, the design of the rotary part, which is conical at least in sections, is limited along the axis of rotation to the section in which the passage conduit extends. In this arrangement, the rotary part is essentially limited to the passage conduit and the adjacent sealing area. The rotary part can also be designed to be conical in sections with respect to a rotation around the axis of rotation. The rotary part may be designed in a segment-like manner with an opening angle with respect to the axis of rotation, which is smaller than 360°, in particular less than 270°, in particular less than 225°, and in particular less than or equal to 200°.

One of the passage openings is an inlet opening to feed the material to be conveyed into the diverter valve. At least two of the passage openings are outlet openings in order to discharge the material to be conveyed, in particular selectively, along one or the other outlet opening. Exactly one inlet opening may be provided which can be selectively connected to one of the exactly two outlet openings by the passage conduit in the rotary part. In this design, the diverter valve is a distribution diverter valve.

Alternatively, the diverter valve can also be used as a collection diverter valve. With the collection diverter valve, at least two of the passage openings serve as inlet openings, in order to feed the material to be conveyed to the diverter valve. In this configuration exactly one outlet opening is provided which can be selectively connected to one of the exactly two inlet openings by the passage conduit in the rotary part.

For adjusting a conveying path through the diverter valve the rotary part is arranged to be rotatably drivable around the axis of rotation in the housing. The rotary part includes a passage conduit, which connects the at least one inlet opening with at least one of the outlet openings for conveying material to be conveyed as a function of its rotational position around the axis of rotation. The passage conduit extends along a passage conduit longitudinal axis, which may be oriented in a straight line and, in particular, perpendicular to the axis of rotation. The passage conduit has two passage conduit openings, which are arranged on the conical outer contour of the rotary part. Each of the passage conduit openings may have a closed outer contour. Preferably, the housing geometry has no sharp transitions. The production of the housing in a metal casting process is simplified, in particular compared to DE 10 2005 061 432 A1. The risk of an undesired formation of pores is reduced. The rotary part and a housing cover can be advantageously made of bar stock. Thereby, the risk of unwanted pores is reduced. In particular, the rotary part can be lathed from a round material, and connecting shafts to an axial drive and a rotary drive may be firmly connected to bases of the round material. The connecting shafts may be welded to the rotary part. Free ends of the connecting shafts may be inserted into depressions on the bases of the rotary part and then welded (i.e., welded in). The housing cover may be made, for example, from a thick sheet metal. The rotary part and the housing cover are particularly suitable for hygienic applications of the diverter valve, as cracks and cavities in which product could be deposited and at which contamination could arise are avoided. Hygienic conditions for the diverter valve are improved. It is advantageous, if the drain opening is arranged at a lowest point of the housing independently of the respective installation position of the diverter valve along a conveyor line in a conveyor system. As a result, automatic (gravity) drainage of the rinsing liquid is reliably ensured. It is also conceivable to provide several drain openings on the housing, in order to independently of the installation position of the diverter valve along a conveyor line make available at least one drain opening, through which an automatic drainage of the rinsing liquid is ensured. The drain opening may have a cross-sectional area that amounts to between 0.01 and 0.5 times the relevant cross-sectional area of the passage openings, in particular between 0.02 and 0.45 times, and in particular between 0.05 and 0.4 times the respective cross-sectional area of the passage openings.

The rotary part may feature recesses and/or apertures, which are not connected to the passage conduits. The recesses and/or apertures may be oriented parallel to the axis of rotation; that is, the recesses and/or apertures extend in a direction along the axis of rotation, in particular parallel to the axis of rotation. The recesses and/or apertures may have a round, kidney-shaped, crescent-shaped, circular-segmented or oval-shaped contour. The contour of the apertures and/or recesses is defined in a plane that is oriented perpendicular to the direction of extension, in particular perpendicular to the axis of rotation. The contour of the recesses and/or apertures along the direction of the aperture may be constant. The recesses and/or apertures can also be designed to be conical or double-conical. The double-conical design is essentially hourglass-shaped, such that the cross-sectional area of the aperture increases towards the base side of the rotary part in order to improve drainage of the cleaning liquid. With a double-conical design, the drainage of cleaning liquid is improved. The recesses and/or apertures improve the rinsing of the cover areas of the diverter valve. Based on the recesses and/or apertures, the mass of the rotary part is reduced.

An axial drive can be provided in order to allow the axial displacement of the rotary part along the axis of rotation. As a result, the rotary part can be displaced axially directly in the housing. Due to the conicity of the rotary part and the housing, the rinsing gap is created. By means of the axial drive, the rotary part can be pressed into the housing with a defined pressing force to obtain the conveying position. The axial drive may be a pneumatic drive with a cylinder. The axial adjustment path arises from the stroke of the cylinder. The stroke of the cylinder and the cone angle gives rise to the width of the rinsing gap in the cleaning position. The pneumatic drive is designed to be uncomplicated and cost-effective. In principle, other drives, in particular an electric motor or a hydraulic drive, are conceivable.

In order to improve the operation of the diverter valve, an axially acting pneumatic cylinder can also be provided with three different target positions. The middle position between the two end positions can be used to rotate the diverter valve, without creating too large a gap between the rotary part and the housing. During cleaning, the middle position can also be used to generate additional movements of the rinsing liquid, if the rotary part is moved back and forth.

A rotary drive can be provided in order to allow the immediate rotatably drivable displacement of the rotary part in the housing. The rotary drive may be a pneumatic drive. In principle, other drives, in particular an electric motor or a hydraulic drive, are conceivable.

While cleaning the diverter valve, the rotary drive can be used to move the rinsing liquid. With an electric motor or a hydraulic drive, the rotary part can be rotated continuously by 360° and generate a uniform movement in the rinsing gap. With a pneumatic rotary drive, the rotary part can be swung back and forth in order to produce additional movement in the rinsing gap.

It is particularly advantageous that the axial drive and the rotary drive are designed to be separate. It is possible to arrange the two drives on the opposite base sides of the housing. The axial drive may be arranged on the base side with the larger base surface of the housing. Given the separate production and arrangement of the drives, the structure of the diverter valve is simplified. Assembly costs and manufacturing costs are reduced. During the cleaning and/or switching of the diverter valve, the drives can be activated independently.

It is advantageous that the rotary part, which is also referred to as a rotary plug, can be pivotally supported on both sides of the housing along the axis of rotation. As a result, guide accuracy is improved which enables a smaller operating gap between the outer contour of the rotary part and the inner contour of the housing.

An arrangement of the drain opening on a base side of the housing which extends substantially parallel to the conveying plane ensures a reliable drainage of the liquid from the housing, independently of the installation position of the housing along the conveyor line. The base surfaces of the housing are oriented in a manner essentially parallel to the conveying plane. If the housing is installed in an orientation with the conveying plane being horizontal, the drainage of the cleaning liquid through the base side of the housing, which is arranged below the conveying plane, is easily possible. If the conveying plane is oriented in a vertical manner, the drain opening may be arranged on the larger of the two base walls of the truncated cone-shaped housing. In order to improve the automatic drainage of the cleaning liquid, the drain opening is then preferably arranged at a 6 o'clock position of the base wall. It is advantageous if the drain opening features a surface normal, which is oriented parallel to the axis of rotation.

The housing may also include a plurality of drain openings, with one drain opening on the base side of the housing being arranged at a lowest point of the housing according to the respective installation position, in order to improve the cleaning of the diverter valve.

An arrangement of the drain opening on a housing body or on a housing cover which is detachably connected to the housing body enables the advantageous adaptation of the diverter valve to the various installation variants of the diverter valve along the conveyor line. In particular, the housing includes a housing body with a housing cover connectable therewith. In the operating state of the diverter valve, thus during the conveyance of the product or during the cleaning of the diverter valve, the housing cover is connected to the housing body. The housing cover is designed to be removable from the housing body. The housing cover is detachably connected to the housing body, for example by fastening screws. It is advantageous if the inner surface of the housing cover and/or of the housing body are designed to be inclined towards the drain opening, at least in areas. As a result, the automatic drainage of the rinsing liquid is improved. It is possible to provide a drainage channel on the inner surface, in order to selectively direct the rinsing liquid to the drain opening. The drain opening is arranged in relation to the axis of rotation in an edge area of the base surface. By using the drainage channels and/or with a corresponding design of the inner surface, the drain opening can be arranged at any position of the base surface.

The ability to arrange the housing cover in different rotational positions on the housing body provides flexibility to use of the diverter valve for various installation positions. The housing cover can be connected to the housing body in various rotational positions with respect to the axis of rotation. The housing cover can be mounted depending on the respective installation position of the diverter valve on the housing body in such a manner that the drain opening is arranged at the lowest point of the diverter valve, such that an automatic drainage of a cleaning liquid is ensured. Thereby, the construction of the diverter valve is simplified. One housing cover, which can be used for various installation positions of the diverter valve, is sufficient. It may be sufficient if exactly one drain opening is provided on the housing cover. The housing cover may be flanged at the housing body, whereas the fastening screws required for the flange connection may be evenly distributed along the flange.

A housing cover seal which is freely accessible from an interior of the housing and in contact with the material to be conveyed is particularly advantageous for the CIP cleaning of the diverter valve. The housing cover seal is designed to contact the product; thus, it is accessible from the interior of the housing for the product and rinsing liquid. The housing cover seal is arranged without any gaps. This prevents the product from being deposited in a gap, in particular between the housing body and the housing cover seal or between the housing cover seal and the housing cover, which could otherwise lead to the growth of germs.

A cone angle of the outer contour of the rotary part between 5° and 80° enables a stable operation of the diverter valve. Operation can be improved by using a cone angle between 10° and 40°. Most preferably, the cone angle is between 15° and 25°. The risk of self-locking and/or cold bonding of the rotary part in the housing is thereby reduced.

A radial gap according which is formed between the outer contour of the rotary part and an inner contour of the housing serves to seal the rotary part in the housing. The radial gap extends preferably between 0.01 mm and 0.5 mm, more preferably between 0.02 mm and 0.5 mm, even more preferably between 0.05 mm and 0.3 mm and most preferably between 0.08 mm and 0.2 mm. The sealing of the rotary part in the housing by the radial gap is also referred to as a gap seal.

Alternatively, the rotary part may rest directly against the inner contour of the housing. In particular, the rotary part with the conical outer contour rests on the correspondingly conical inner contour of the housing. A radial gap is then not present or amounts to 0 mm. It is conceivable to adjust the radial gap by its axial positioning along the axis of rotation in the housing and/or set it depending on the system pressure of the rotary part in the housing upon retracting the rotary part in the housing. It is particularly advantageous if the at least one of the abutting surfaces of the housing and the rotary part has an elevated hardness. In this case, the housing and the rotary part form a hard-soft pairing. It is also conceivable that the surfaces of the housing and the rotary part are hardened. Hardening by means of a chromium layer is particularly advantageous.

Cone sealing elements which are arranged with respect to the axis of rotation circumferentially on the rotary part ensure the additional sealing of the rotary part in the housing. In particular, O-rings may be used as cone sealing elements. O-rings are robust in use and cost-efficient to use.

Alternatively, passage conduit sealing elements can be used to seal the passage conduit. The passage conduit sealing elements are made, in particular, of an elastomer material. When using the passage conduit sealing elements, it is advantageous if the radial gap between the outer contour of the rotary part and the inner contour of the housing relative to the gap seal is increased. The radial gap when using the passage conduit sealing elements amounts to 0.2 mm to 2.0 mm, preferably 0.3 mm to 1.2 mm and in particular between 0.4 mm and 0.8 mm.

The design of the diverter valve with each of the passage conduit sealing elements being held in a respective sealing groove of the rotary part ensures a reliable and secure attachment of the passage conduit sealing elements to the rotary part. The passage conduit sealing elements may be clamped in each of the sealing grooves. The unintentional removal of the sealing conduit sealing elements from the respective groove can be ruled out.

A sealing groove, in which the sealing conduit sealing element can be held in a form-fitting manner, is designed in particular to be dovetail-shaped. It is also conceivable that the groove width increases only in one direction with increasing groove depth. It is advantageous if the passage conduit sealing element is designed to be essentially dovetail-shaped, at least in the section with which the passage conduit sealing element is arranged within the sealing groove. Other geometries for the passage conduit sealing element and the sealing groove are also conceivable. It is essential that the passage conduit sealing element in the sealing groove, in particular in the radial direction, is held in a form-fitting manner. The passage conduit sealing element largely fills in the shape of the sealing groove. The passage conduit sealing element can be designed as a three-dimensional molded seal or as an essentially two-dimensional flat seal. The unintentional withdrawal of the passage conduit sealing element is prevented. The arrangement of the passage conduit sealing element in the seal groove is reliable.

A transitional chamfer on the passage conduit sealing element ensures a flush transition of the surfaces of the rotary part and the passage conduit sealing element. By means of the transitional chamfer, a sudden transition between the surface of the rotary part and the surface of the passage conduit sealing element is prevented. The transitional chamfer is designed, for example, as a straight, inclined surface, but may in particular feature a convexly shaped contour, which may in particular also be crowned, spherical or curved.

In addition or as an alternative to the transitional chamfer, the passage conduit sealing element may have a transitional section to enable a flush transition of the surfaces of the rotary part and the passage conduit sealing element. The transitional section may be designed to be straight, in particular at least in sections, curved, in particular at least in sections, or round, in particular in sections.

The passage conduit sealing element may be arranged in a specially shaped O-ring groove, which is completely filled by the seal. The sealing groove may be free of dead space. In order to improve the sealing effect, the passage conduit sealing element can be designed as an O-ring with an integrally formed sealing lip and/or with a specially shaped sealing contour. The sealing lip may rest on the housing, if the rotary part is maximally driven in an axial manner into an end position in the housing. The sealing groove may include rounded transitions and/or round and straight sections in the transition of the rotary part surface to the sealing groove. The passage conduit sealing element is designed to be complementary to the sealing groove, whereas its sealing surface protrudes from the sealing groove with a projection section, thus projecting from the sealing groove.

It is advantageous if the cross-sectional shape of the seal corresponds to the contour of the sealing groove, such that the sealing groove is completely filled by the seal.

It is advantageous if, during cleaning (i.e., during the introduction of the cleaning liquid), the rotational movement of the rotary part features a rotational angle that is greater than a required rotational angle for changing the position of the rotary part for the switching of the passage openings.

It is particularly advantageous if the rotational movement of the rotary part features a rotation angle that is greater than 360°.

It is particularly advantageous if the rotational movement and the axial movement of the rotary part take place simultaneously; that is, an overlapping rotational and axial movement takes place. This overlapping movement is essentially a screwing movement. Alternatively, the rotational movement and the axial movement of the rotary part, in sections in particular, can take place sequentially, whereas the order of the sequence need not be fixed. It is essential that the rotary part is transferred from a working position, in which the passage conduit is set between two passage conduit openings, into a cleaning position, whereas rotational and/or axial movements of the rotary part may be required for this purpose.

The diverter valve may be cleaned by performing the following steps:
  end conveyance of the material to be conveyed;
  initiate the cleaning;
  pull the rotary part along the axis of rotation axially within housing;
  introduce a cleaning liquid through at least one of the passage openings;
  rotate the rotary part around the axis of rotation while introducing the cleaning liquid;
  end the introduction of the cleaning liquid;
  remove the cleaning liquid from the diverter valve;
  dry the diverter valve by introducing hot gas; and
  end the drying process.

By following these steps cleaning of a diverter valve is improved. The cleaning process is reliable and is possible, in particular, in a closed state of the diverter valve; i.e., with a mounted housing cover. The method enables CIP cleaning.

During the feed of the cleaning liquid, the rotary part is moved around the axis of rotation. In addition, an axial movement of the rotary part can take place along the axis of rotation.

While drying the diverter valve through the introduction of hot gas, the diverter valve can be rotatably moved around the axis of rotation and/or axially at the axis of rotation.

During cleaning, the rotary part can be advantageously arranged in a rotational center position, whereas, in the rotational center position, the passage conduit of the rotary part is not arranged in alignment with at least one passage opening. The arrangement, which is not in alignment, also includes intermediate positions that deviate from the channel plane, but provide a cleansing effect for the diverter valve.

A drainage valve in the housing cover may be opened at the end of cleaning prior to the drying of the diverter valve, in order to allow remaining cleaning liquid to be drained. This enables an advantageous drying of the diverter valve.

Upon the rotation of the rotary part in an intermediate position, both passage openings can be rinsed, in particular at the same time, and at the same time the rotary part is axially displaced into the rinsing position.

According to an additional method comprising the rotating of the rotary part, the mode of operation of the diverter valve is improved. Due to the complete resting of the rotary part, in particular in the area of the conical design on the housing inner cone, a radial gap of up to 0 mm is provided. This means that, in this arrangement, gap-free operation is possible. To rotate the rotary part, it is slightly withdrawn in the axial direction, for example by a maximum of 0.1 mm from the housing. This results in a rotational gap between the outer contour of the rotary part and the inner contour of the housing of 0.2 mm to 2 mm. It is essential that the rotary gap is minimal, but just so large that the rotary part is rotatable in the housing. The smaller the rotary gap, the less product can penetrate into the gap, for example, upon conveying the product. With a small rotary gap, however, there is also an increased risk that the product already deposited in the housing during rotation will present mechanical resistance and generate frictional heat. When defining the rotary gap, possible product deposits, driving forces and operational safety must be taken into account.

In a third position, the rotary part is pulled axially into a rinsing position, for example by up to 40 mm. This creates a rinsing gap with a gap width of 0.15 mm to 3.0 mm. For this purpose, the axial drive, which is designed in particular as a cylinder, receives three defined positions that must be approached.

BRIEF DESCRIPTION OF THE DRAWINGS

Various alternative diverter valves will be described in more detail with reference to the following drawings:

FIG. 4 is a view corresponding to FIG. 2 with a vertical passage direction and an outlet upwards.

FIG. 5 is a view of the diverter valve corresponding to FIG. 2 with a vertical passage direction and an outlet slanting downwards.

DETAILED DESCRIPTION

Figure 1:
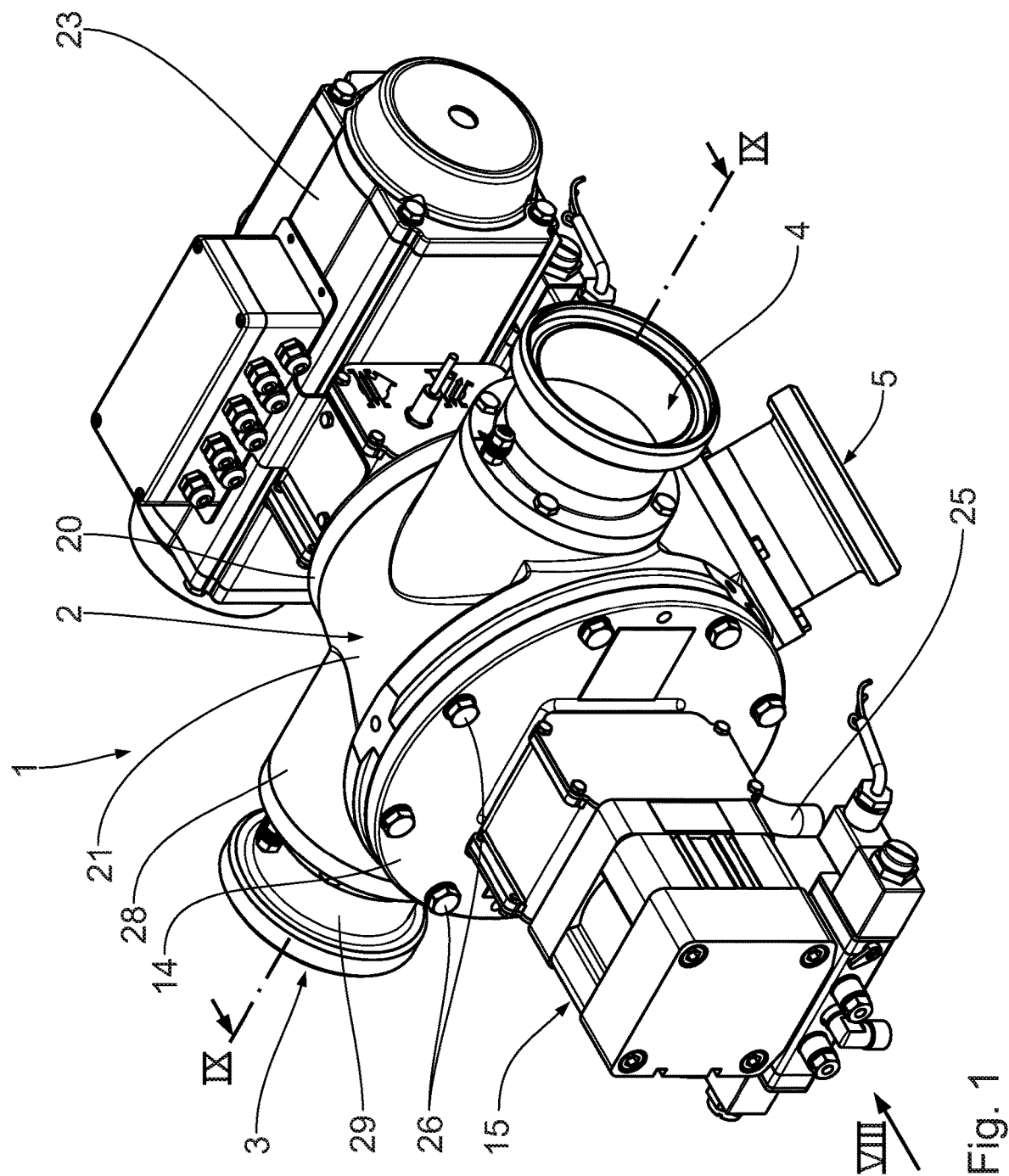
FIG. 1 is a perspective view of a three-way diverter valve.
Figure 2:
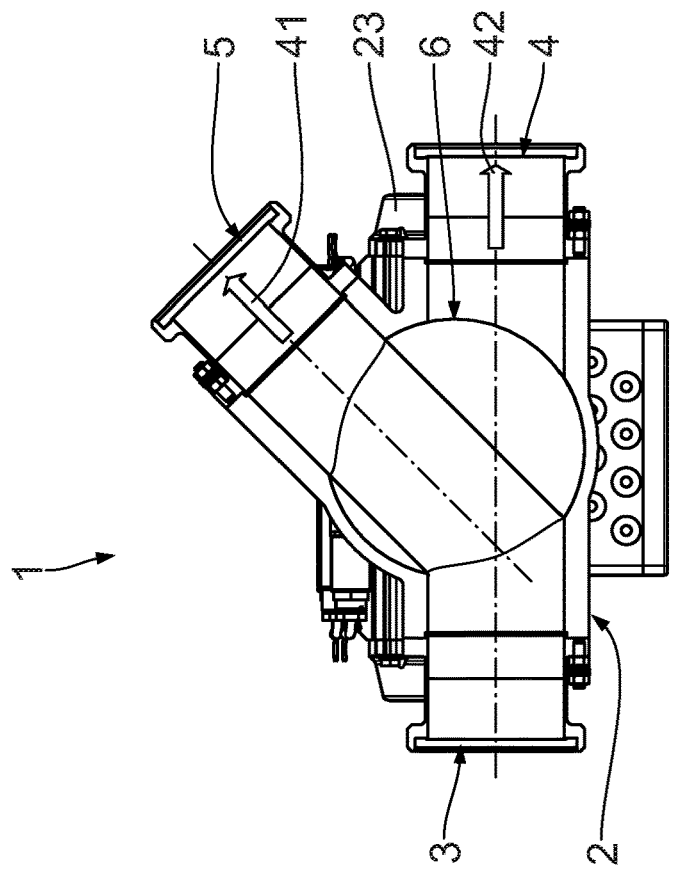
FIG. 2 is a simplified schematic view of the installation location of the diverter valve with a horizontal passage direction and an outlet downwards.

A diverter valve 1 shown in FIG. 1 to FIG. 12 serves to convey material to be conveyed. The material to be conveyed is, for example, bulk material, in particular particulate and/or powdered material, for example plastic granules or particulate and/or powdered foodstuffs. The bulk material may be conveyed pneumatically. The material to be conveyed can also be a pasty mass and/or liquid (i.e., a fluid).

The diverter valve 1 is designed as a three-way diverter valve. The diverter valve 1 includes a housing 2, on which a first passage opening 3, a second passage opening 4 and a third passage opening 5 are provided. The passage openings 3, 4, 5 serve to feed and/or discharge the material to be conveyed. The passage openings 3, 4, 5, in particular the center lines of the passage openings 3, 4, 5, define a conveying plane.

A rotary part 6 is arranged in the housing 2. The rotary part 6 features an axis of rotation 7, which is oriented perpendicular to the conveying plane. The rotary part 6 is arranged in an axially displaceable manner in the housing 2 along an axis of rotation 7. The initial gap adjustment between the outer contour 9 of the rotary part 6 and the inner contour 17 of the housing 2 takes place through the setting of the axial position of the rotary part 6 in the housing 2. According to the embodiment shown, such gap adjustment takes place with a threaded sleeve 32, through which, for example, by means of a tool from outside of the housing 2, a stepless (thus, continuous) axial displacement of the rotary part 6 in the housing 2 is possible. The rotary part 6 is rotatably arranged in the housing 2 around the axis of rotation 7.

The rotary part 6 includes a passage conduit 8. The rotary part 6 can be arranged in an angled orientation shown in FIG. 9, in which the first passage opening 3 is directly connected to the third passage opening 5 via the passage conduit 8. In the angled orientation, the second passage opening 4 is sealed by the rotary part 6. The three-way diverter valve 1 thus makes it possible that, in the angled orientation, the first and third passage openings 3, 5 are connected to one another for conveying material along an outlet direction 41 and the second passage opening 4 is shut off by the rotary part 6.

Figure 10:
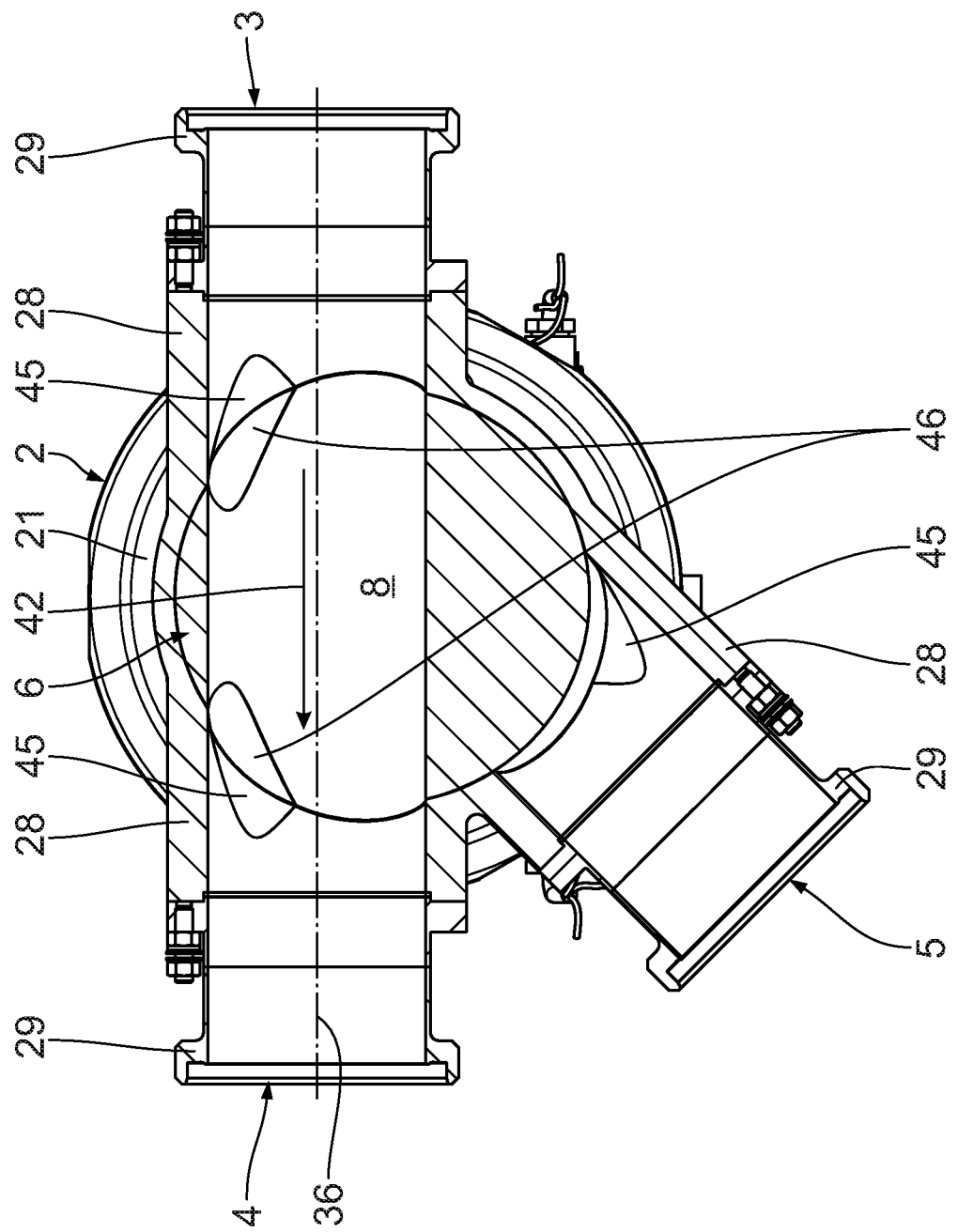
FIG. 10 is a sectional view of the diverter valve correspond to FIG. 9 in the straight-through orientation.
Figure 11:
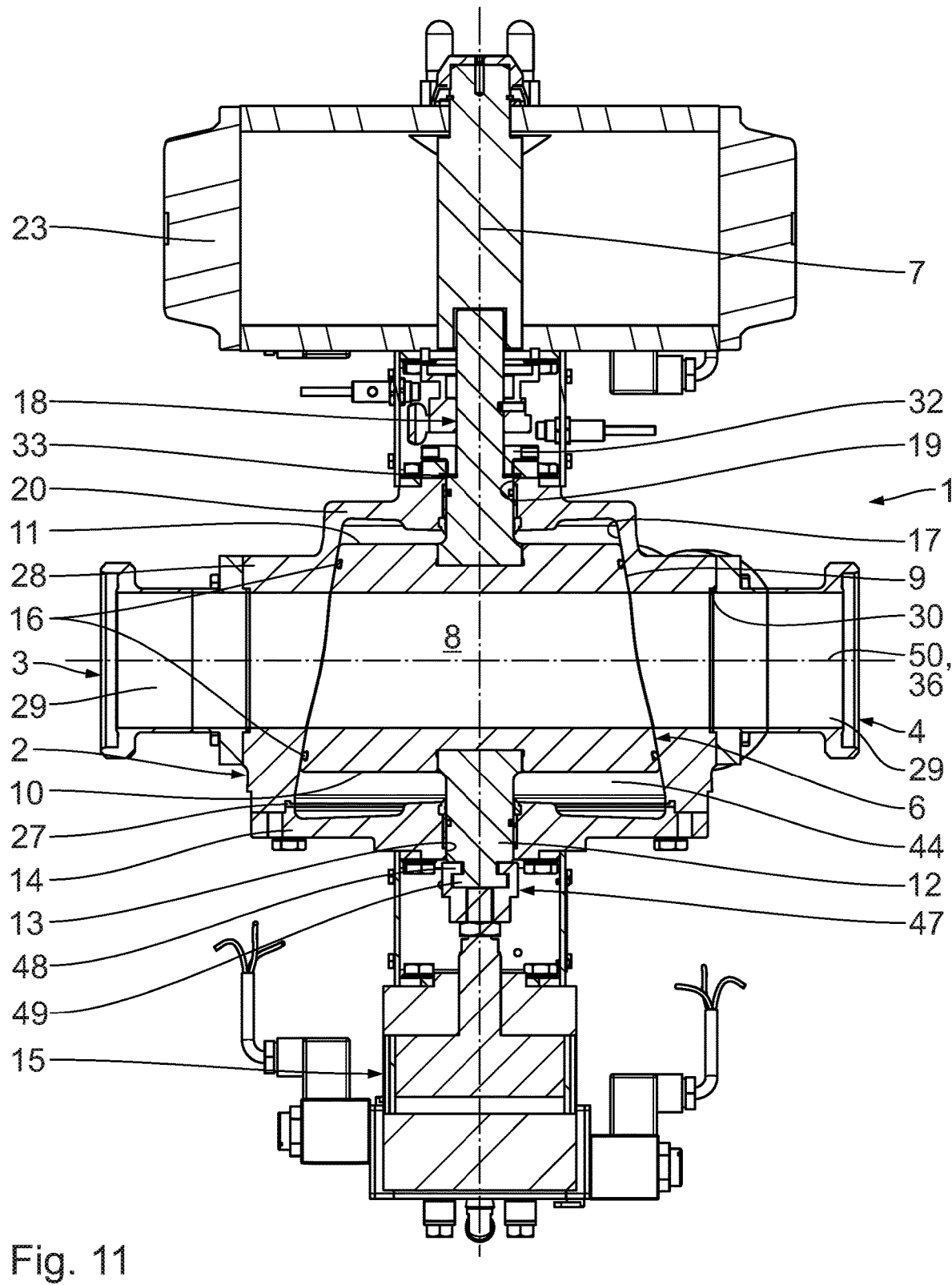
FIG. 11 is a longitudinal sectional view of the diverter valve relative to the conveying direction in the straight-through orientation.

Accordingly, FIG. 10 shows a straight-through orientation in which the first passage opening 3 is connected to the second passage opening 4 via the passage conduit 8 for conveying material along a passage direction 42. Between the first passage opening 3 and the second passage opening 4, the passage direction 42 is designed in a straight line. The first passage opening 3 and the second passage opening 4 are arranged on the housing 2 essentially opposite one another, in particular diametrically opposite one another. The third passage opening 5 is sealed by the rotary part 6. With respect to the passage direction 42 between the first passage opening 3 and the second passage opening 4, the outlet direction 41 is angled from the first passage opening 3 to the third passage opening 5 at an outlet angle β. According to the embodiment shown, the outlet angle β amounts to 45°. It is advantageous if the outlet angle β amounts to between 30° and 90°, preferably between 40° and 60° and most preferably between 42° and 50°.

Figure 6:
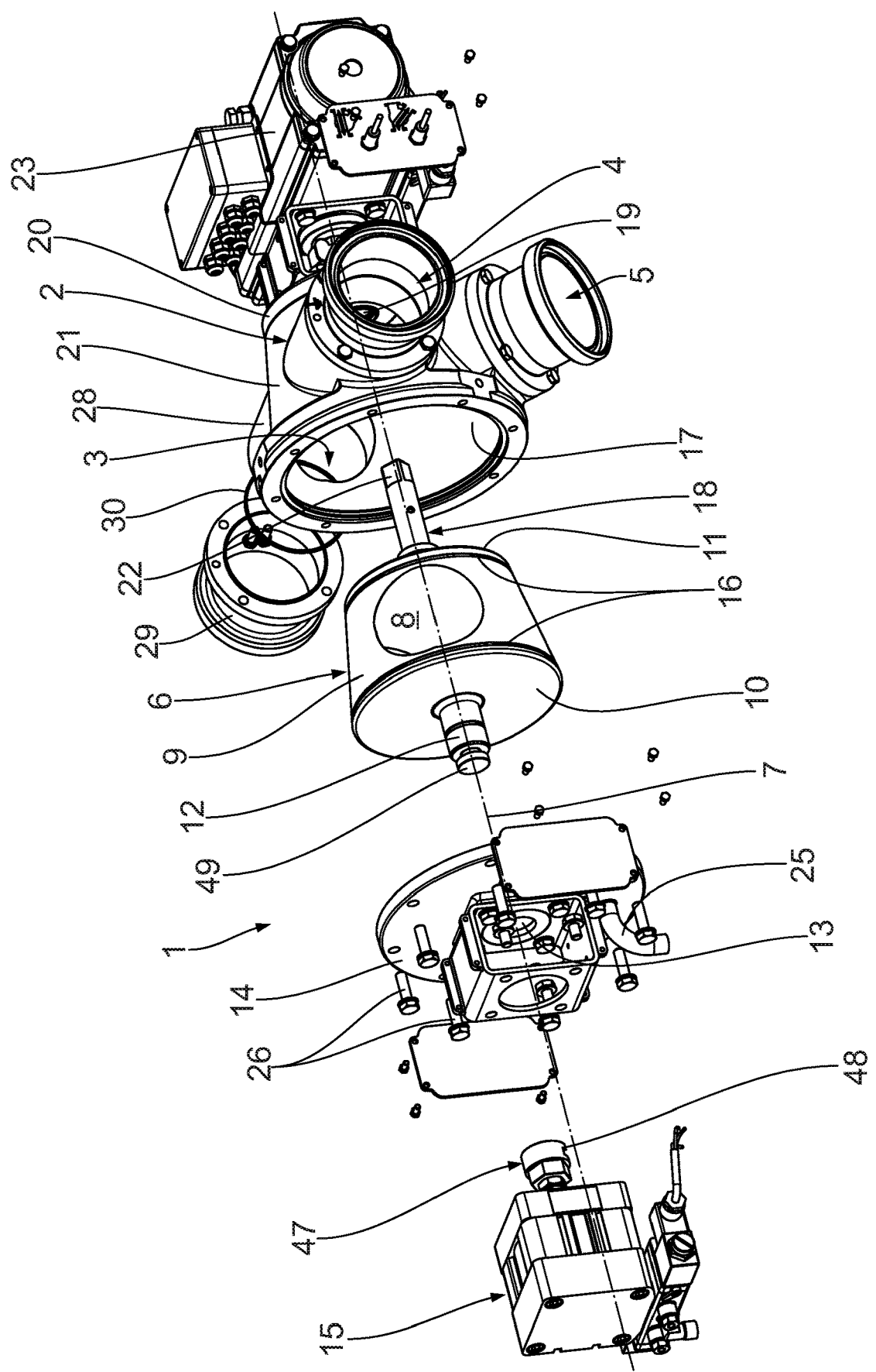
FIG. 6 is an exploded view of the diverter valve in FIG. 1.
Figure 7:
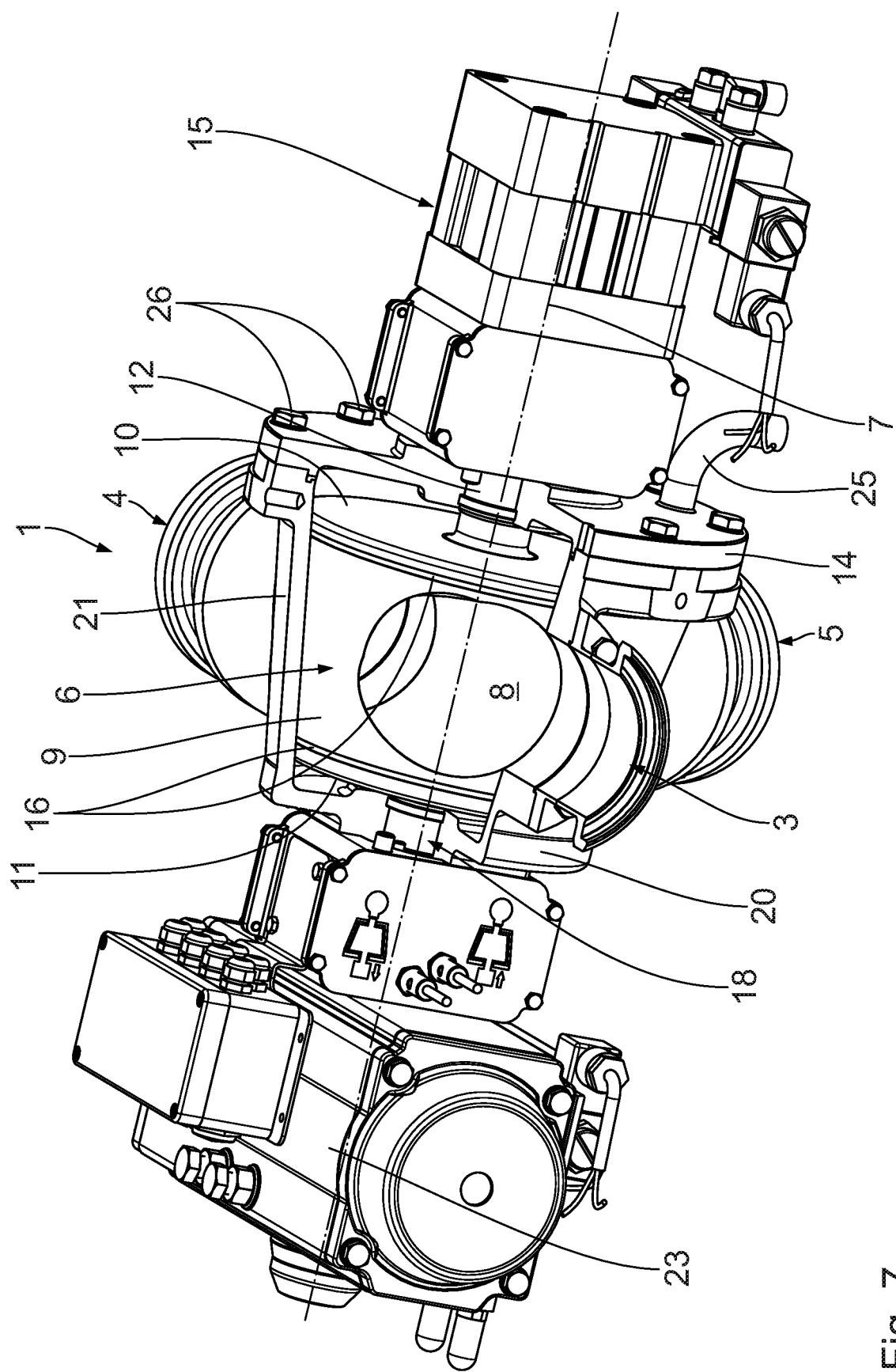
FIG. 7 is an additional perspective view of the diverter valve according to FIG. 1 with a partially cut housing.
Figure 8:
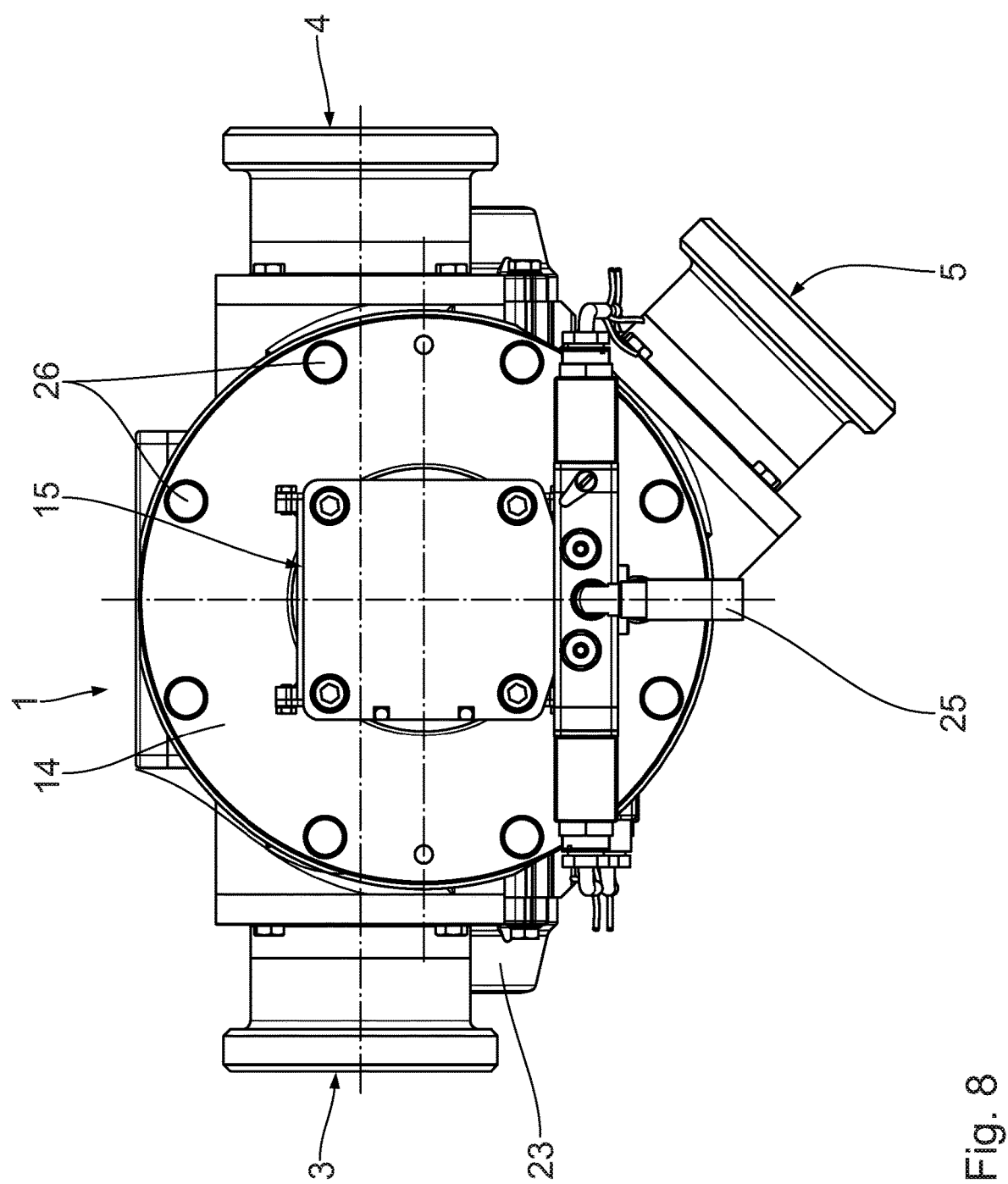
FIG. 8 is a view of the diverter valve according to arrow VIII according to FIG. 1.
Figure 9:
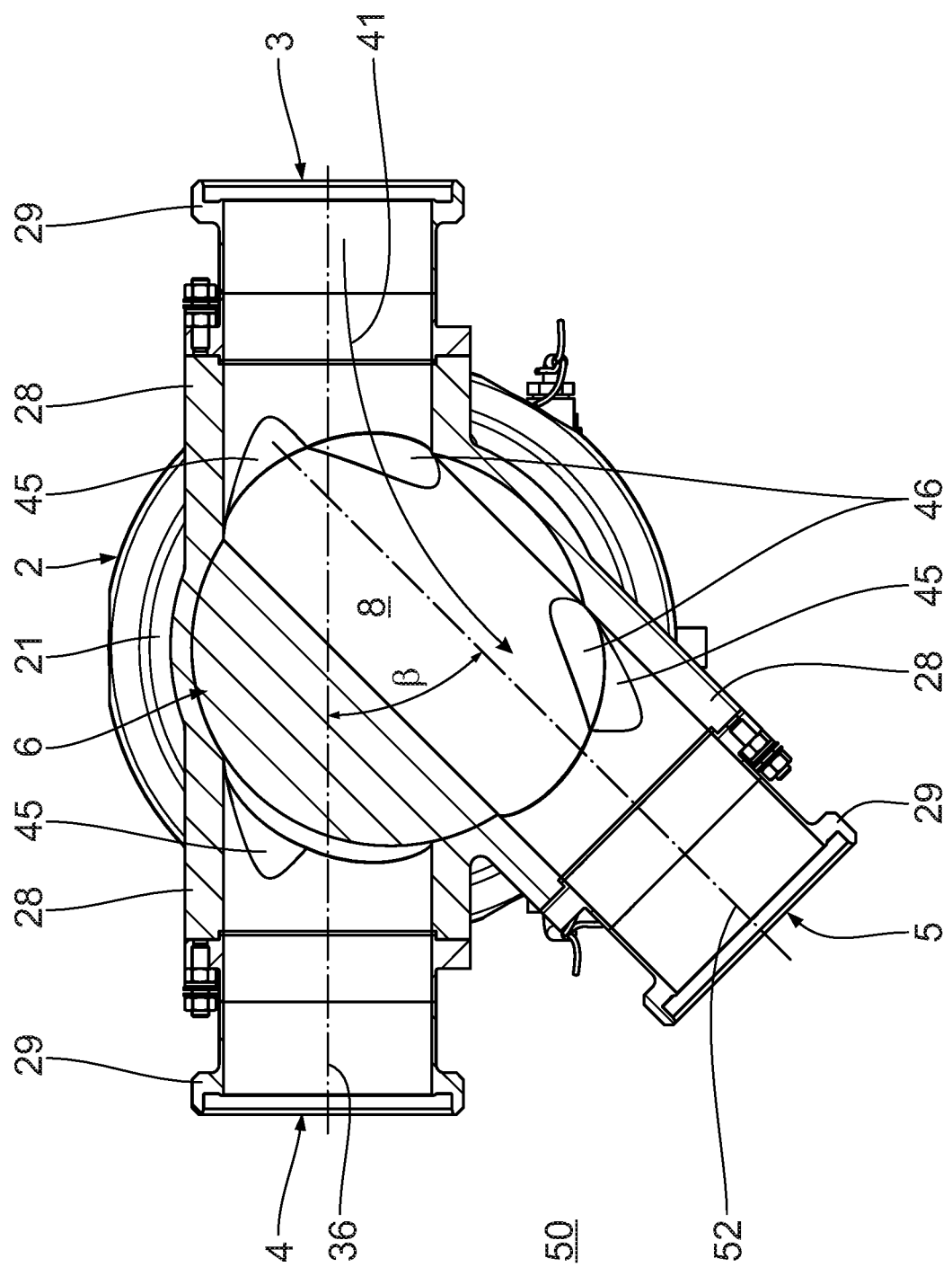
FIG. 9 is a sectional view along section line IX-IX in FIG. 1 with the diverter valve in the angled orientation.

With respect to its axis of rotation 7, the rotary part 6 is designed essentially as a truncated cone; that is, it features a conical outer contour 9 along the axis of rotation 7, at least in sections. As shown in FIG. 6, the axis of rotation is the exploded axis. The passage conduit 8 is oriented perpendicular to the axis of rotation 7. The passage conduit is arranged eccentrically on the rotary part 6 with respect to the axis of rotation 7.

The truncated cone geometry of the rotary part 6 is limited by a larger base surface 10 and a smaller base surface 11. According to the embodiment shown, each of the base surfaces 10, 11 is oriented in a manner perpendicular to the axis of rotation 7 and is designed to be flat. Each of the base surfaces 10, 11 may also be formed to be convex and in particular designed to be inclined and/or curved, at least in sections.

At the larger base surface 10, an axial drive shaft 12 is attached to the rotary part 6. The axial drive shaft 12, which is guided out of the housing 2 through a first opening 13 in a housing cover 14, is connected to an axial drive 15 via a coupling 47. The axial drive 15 is designed as a pneumatic drive, in particular as a pneumatic cylinder, in particular as a lifting drive. The axial drive 15 can also be designed as an electric motor or hydraulic cylinder. The axial drive 15 enables a driven axial displacement of the rotary part 6 in the housing 2 along the axis of rotation 7. The axial drive 15 may be designed with an intermediate position, which enables the rotary part 6 to move into an axial intermediate position in the housing 2 along the axis of rotation 7. In the axial intermediate position of the rotary part 6 in the housing 2, the diverter valve 1 can be operated and/or rotated with a small gap of between 0.01 mm and 0.5 mm.

The coupling 47 enables a connection between the axial drive 15 and the axial drive shaft 12 directed in the axial direction of the axis of rotation 7, for the transmission of axial forces. With respect to the axis of rotation 7, the coupling 47 is designed to be free of torque. A rotational movement of the rotary part 6 is not transmitted to the axial drive 15 by the coupling 47. In the embodiment shown, the coupling 47 is designed to be sleeve-shaped, with a bundled coil 48 that is turned towards the axial drive shaft 12 and directed radially inwardly. In the axial direction of the axis of rotation 7, the bundled coil 48 engages behind a ring-shaped disk section 49 of the axial drive shaft 12. The ring-shaped disk section 49 is rotatably arranged in the sleeve section of the coupling 47. The ring-shaped disk section 49 is formed in one piece on the axial drive shaft 12 and is arranged on the front side of the axial drive shaft 12.

On the rotary part 6, two cone sealing elements 16 are provided. These are arranged with respect to the axis of rotation 7 on the rotary part 6 axially spaced from one another. According to the embodiment shown, each of the cone sealing elements 16 is designed as an O-ring. The cone sealing elements 16 serve to seal the conical surface; that is, the conical outer contour 9 on the corresponding inner contour 17 of the housing 2.

One of the cone sealing elements 16 each is arranged adjacent to the larger base surface 10 and the smaller base surface 11. In particular, the passage conduit 8 is arranged along the axis of rotation 7 between the two cone sealing elements 16.

At the smaller base surface 11, a rotary drive shaft 18 is attached to the rotary part 6 and led out through a second opening 19 in the housing bottom 20. The housing bottom 20 may be integrally formed with the housing body 21. The rotary drive shaft 18 includes, at least in sections, along the axis of rotation 7, a torque-transmitting section 22, which is designed to be uneven in the plane perpendicular to the axis of rotation 7 and, according to the embodiment shown, has an outer square geometry. With the torque-transmitting section 22, the rotary drive shaft 18 can be coupled to a rotary drive 23 in a manner that transmits torque. By means of the rotary drive 23, the rotary part 6 can be rotatably driven in the housing 2 with respect to the axis of rotation 7. The rotary drive 23 is designed as a pneumatic rotary drive. The rotary drive 23 can also be designed as an electric motor, a hydraulic motor or a hydraulic cylinder. The rotary drive 23 enables the rotation of the rotary part 6 between the angled orientation according to FIG. 9 and the straight-through orientation according to FIG. 10.

In the housing 2, in particular in the connection pieces 28 allocated to the passage openings 3, 4, 5, pocket-shaped depressions 45 are provided on the inner surfaces. Each of the depressions 45 cooperates with a corresponding free-form surface 46 in the passage conduit 8 of the rotary part 6. The pocket-shaped depressions 45 are formed in the housing 2 asymmetrically with respect to a longitudinal center plane 50, which is spanned by the axes 36, 52 of the passage openings 3, 4, 5. The longitudinal center plane 50 corresponds to the plane of the drawing according to FIGS. 9 and 10. In particular, in the angled orientation according to FIG. 9 but also in the straight-through orientation according to FIG. 10, a transition at the passage conduit 8 is designed to be free of edges; that is, free of joints. A geometric joint is avoided through the adjustment of the contours in the connecting piece 28 and in the passage conduit 8. With regard to the avoidance of the geometric joint, reference is made to DE 39 22 240 C2.

According to the embodiment shown, a drain opening 24, to which a drain bend 25 is attached, is provided on the housing cover 14. The drain bend 25 may be welded to the housing cover 14. The drain bend 25 forms part of the drain line.

According to the embodiment shown, the drain opening 24 is integrated in the housing cover 14. The housing cover 14 has an inclined inner surface, which is inclined towards the drain opening 24. The inner surface of the housing cover 14 is sloping outwards. The drain opening 24 is arranged in relation to the axis of rotation 7 in a manner that is maximally radially spaced. The drain opening 24 is arranged in a horizontal installation position, in which the housing cover 14 is oriented in a vertical manner, at a lowest point of the housing 2 of the diverter valve 1. Via the drain opening 24 and the drain bend 25, a liquid can automatically drain from the interior of the housing 2 as a result of gravity.

Given that the housing cover 14 can be screwed in different rotational positions around the axis of rotation 7 with the housing body, providing exactly one drain opening 24 on the housing cover is sufficient. Depending on the installation position of the diverter valve 1, the housing cover 14 can be screwed to the housing body 21 in such a manner that the drain opening 24 forms the lowest point of the housing 2.

The housing cover 14 is screwed to the housing body 21 by a plurality of fastening screws 26. The housing cover 14 is arranged in a sealed manner to the housing body 21 by means of a circumferential ring seal 27. The ring seal 27 is a housing cover seal. The ring seal 27 is designed to be freely accessible from the interior of the housing 2 of the diverter valve 1. The ring seal 27 is designed to contact the product. The ring seal 27 enables a wet cleaning of the housing 2, without the housing 2 having to be opened. The diverter valve 1 can be cleaned by a liquid in the closed state. The diverter 1 enables a liquid cleaning under cleaning-in-place hygiene requirements.

With respect to the axis of rotation 7, the outer contour 9 of the rotary part 6 is designed with the cone angle ϰ. The cone angle ϰ amounts to 20° according to the embodiment shown. It is advantageous if the cone angle ≅ amounts to between 5° and 80°, preferably between 10° and 40°, in particular between 15° and 25°.

For a simplified and improved connection of conveyor lines to the housing 2, connecting pieces 28, each of which is formed in one piece on the housing body 21, are provided on the passage openings 3, 4, 5. Advantageously, a pipe bracket 29, sealed by means of a flange seal 30 contacting the product, can be flanged on the connecting piece 28. Through the pipe bracket 29, a standardized connection interface is provided to integrate the diverter valve 1 in a conveyor system. The pipe bracket 29 can be easily screwed to the housing. This makes it possible to adjust the diverter valve 1, through the suitable selection of the pipe bracket 29, to the required pipe cross-section and flange connection of a conveyor system. The diverter valve can be flexibly and easily integrated into an existing conveyor system.

The function of the diverter valve 1 with a gap seal is described in more detail below.

For the conveying of a material to be conveyed along the passage direction 42 or the outlet direction 41, the rotary part 6 is initially arranged in the housing 2 in a sealed manner. For a sealed arrangement of the rotary part 6 in the housing 2, the rotary part 6 is pressed by means of the axial drive 15 along the axis of rotation 7 in the housing 2, until the rotary part 6 is arranged with a defined radial gap between the outer contour 9 and the inner contour 17 in the housing 2. The radial gap amounts to between 0.01 mm and 0.5 mm, preferably between 0.02 mm and 0.5 mm, more preferably between 0.05 mm and 0.3 mm, and most preferably between 0.08 mm and 0.2 mm.

In this arrangement, the rotary part 6 is sealed in the housing 2 by means of the cone sealing elements 16. The rotary part 6 is in a conveying position, which is also referred to as a conveyor orientation. The gap seal can also be designed without the cone sealing elements 16. A conveyance of material via the interconnected passage openings 3, 5 or 4, 5, as the case may be, along the passage conduit 8 on a sealed basis is possible. For a change of the material conveying path from the passage direction 42 to the outlet direction 41 or vice versa, the rotary part 6 is rotated around the axis of rotation 7 by means of the rotary drive 23. The rotation of the rotary part 6 and the axis of rotation 7 can take place in the conveying orientation of the rotary part 6 in the housing 2. In the sealed arrangement in the housing 2, the rotary part 6 is rotatable around the axis of rotation 7. In order to support the rotation of the rotary part 6, prior to the rotational movement, the rotary part 6 can be pulled out of the sealed arrangement along the axis of rotation 7 in the housing 2; i.e., it can be displaced towards the axial drive 15.

Figure 12:
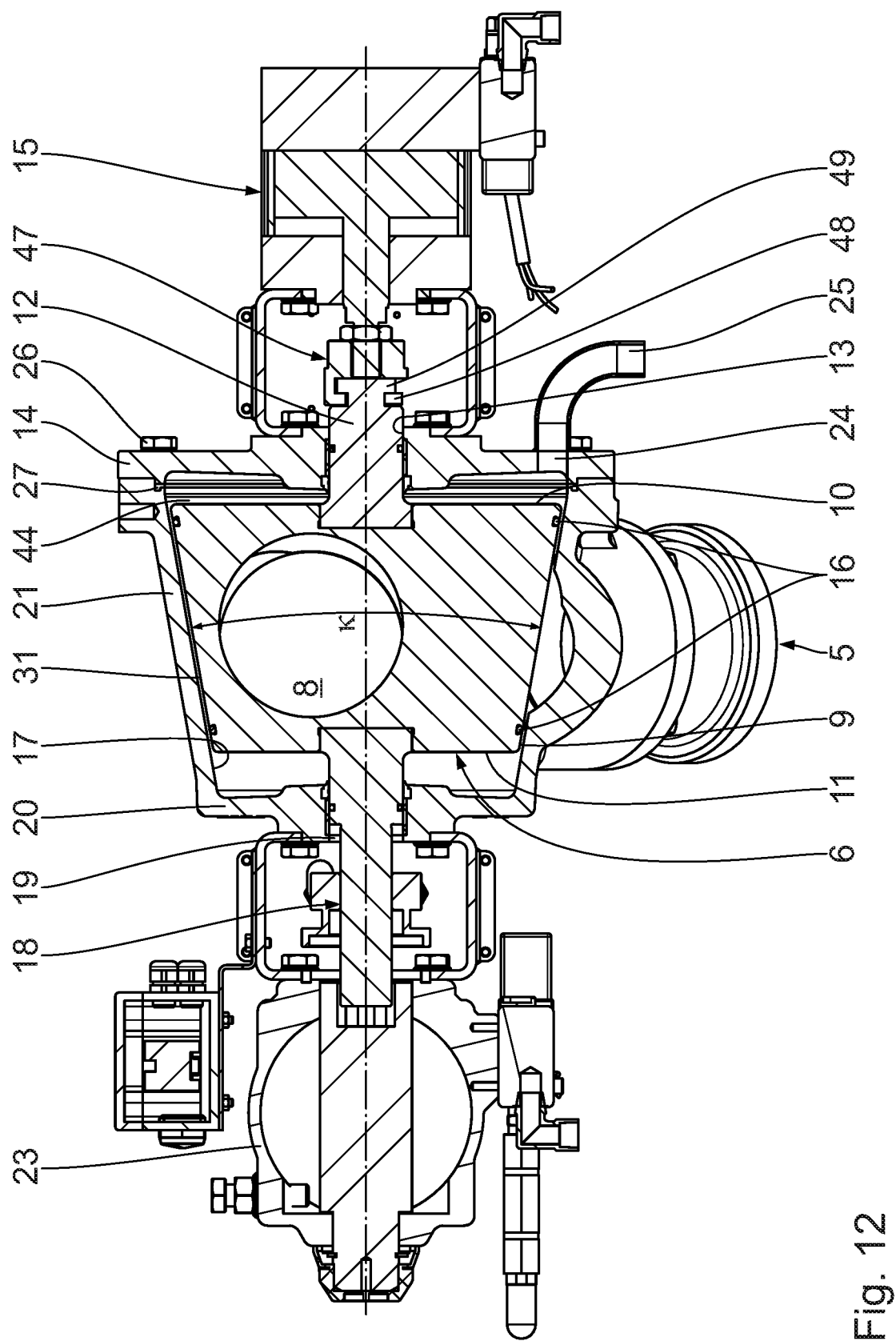
FIG. 12 is a cross-sectional view of the diverter valve relative to the conveying direction in a rinsing configuration.

For cleaning the diverter valve 1, a rinsing of the passage conduit 8 initially takes place via the conveyor lines in the passage direction 42 and the outlet direction 41 connected to the diverter valve 1, whereas the rotary part 6 remains in the conveying position. Subsequently, the rotary part 6 is displaced axially along the axis of rotation 7 in the housing 2 to the housing cover 14. The rinsing configuration of the diverter valve 1 is shown in FIG. 12. For this purpose, the housing 2 features a free space 44, into which the rotary part 6 with the larger base surface 10 can be displaced. During the axial displacement of the rotary part 6, the housing 2 remains closed. For the cleaning of the diverter valve 1, in particular for the flushing of the rotary part 6 and the inner surfaces of the housing body 20 and the housing cover 14, an opening of the housing 2 is not required.

Through such axial displacement, the radial gap between the outer contour 9 and the inner contour 17 is increased. In the cleaning configuration or rinsing configuration of the diverter valve 1 according to FIG. 12, the cleaning gap 31 has a size of approximately 1.5 mm to 2.0 mm. It is advantageous if the cleaning gap 31 has a size of 0.5 mm to 4 mm, in particular between 1.0 mm and 3.0 mm.

The cleaning gap 31 is also referred to as a rinsing gap. The cleaning gap 31 makes it possible for cleaning liquid, which is feed into the housing 2, for example via the passage openings 3, 4, 5, to moisten with cleaning liquid the surface sections of the outer contour 9 of the rotary part 6, the inner contour 17 of the housing 2, and the inner surface of the housing cover 14. The entire interior of the housing 2, in particular the gap between the outer contour 9 and the inner contour 17, can be rinsed with cleaning liquid. The cleaning configuration according to FIG. 12 is also referred to as a rinsing configuration.

This makes it possible to remove deposits and unintentional contaminants from the diverter valve. The cleaning liquid can leave the housing 2 automatically due to gravity through the drain opening 24 arranged at the lowest point of the housing 2. FIG. 12 shows the diverter valve 1 in an installed position, with which the housing cover 14 is oriented in a vertical manner. In the arrangement shown in FIG. 12, the passage direction 42 is oriented in a horizontal manner. The outlet direction 41 is directed obliquely downwards. The conveying plane is oriented in a vertical manner. This arrangement is shown schematically in FIG. 2.

Figure 3:
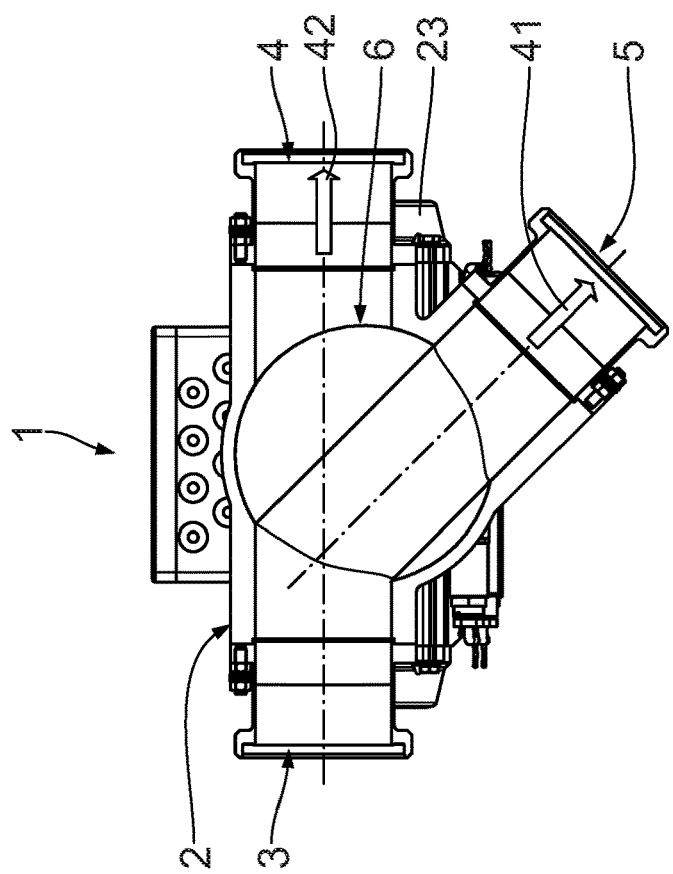
FIG. 3 is a view corresponding to FIG. 2 with a horizontal passage direction and an outlet upwards.

In principle, an installation position with a horizontal passage direction 42 and an outlet direction 41 obliquely upwards, as in FIG. 3, is also possible. In this arrangement as well, the conveying plane is oriented in a vertical manner. Accordingly, the housing cover 14 is oriented in a vertical manner.

An installation location with which the passage direction 42 is oriented in a vertical manner with an outlet direction 41 obliquely upwards (see FIG. 4) or obliquely downwards (see FIG. 5), is also possible. In both cases, the conveying plane is oriented in a vertical manner. In both cases, the housing cover 14 is oriented in a vertical manner.

The diverter valve can also be used if the housing cover 14 is oriented in a horizontal manner. It is advantageous if the housing cover 14 is arranged in the horizontal installation position on the upper side of the housing 2. The removal of the rotary part 6 for maintenance and/or cleaning purposes is simplified. In principle, the arrangement with which the housing cover 14 is oriented in a horizontal manner and is arranged on the underside of the housing 2, is also conceivable.

With the disclosed diverter valve, the installation position and the nature of the seal of the rotary part 6 in the housing 2 are independent of one another. Any type of seal of the rotary part relative to the housing can be used in any installation position.

Figure 13:
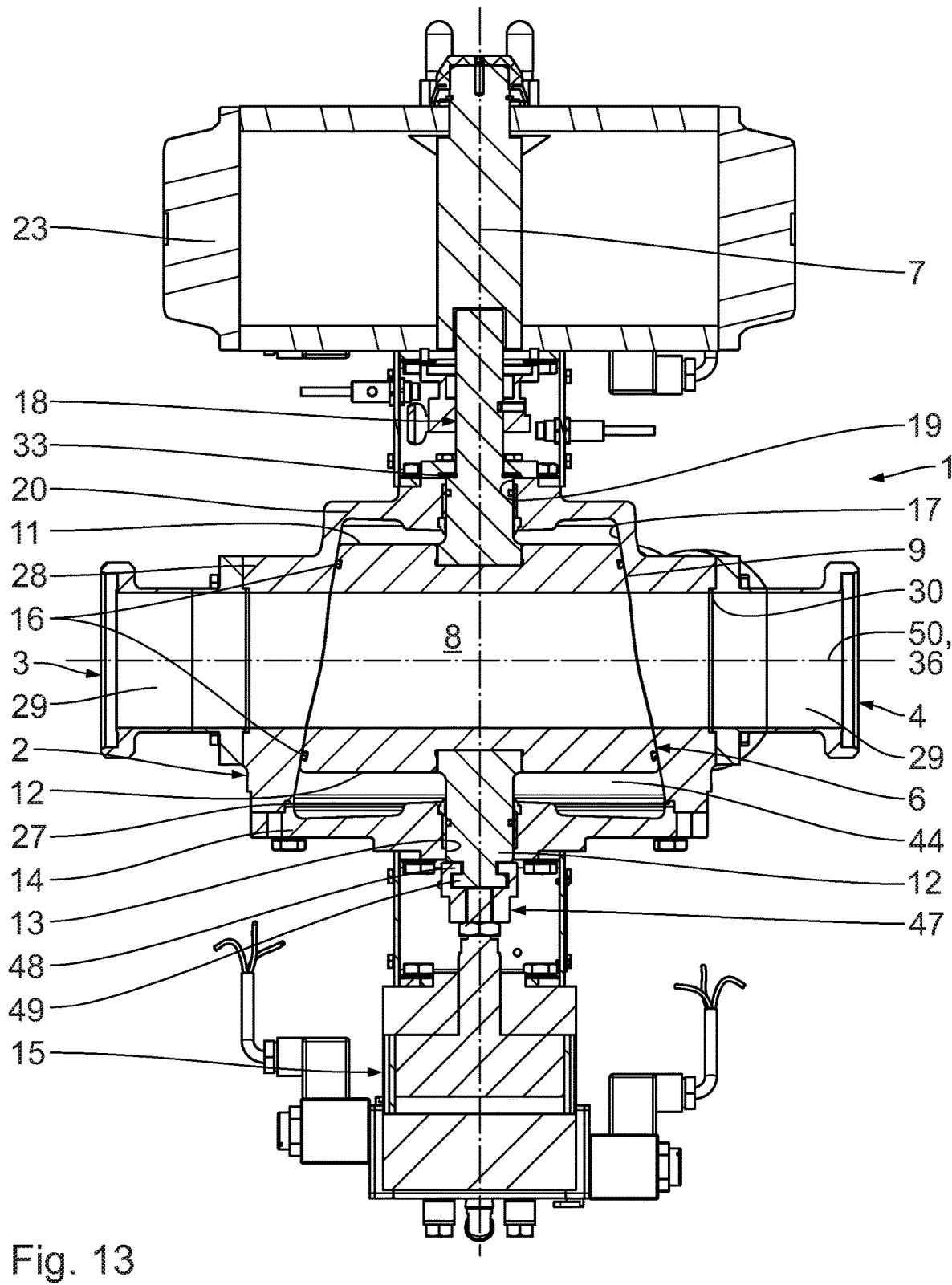
FIG. 13 is a sectional view of a diverter valve corresponding to FIG. 11 according to an additional embodiment with a spacer for adjusting the rinsing configuration.

FIG. 13 shows an additional embodiment of a diverter valve 1, whereas the axial adjustment of the rotary part 6 takes place in the housing 2 by means of a spacer 33. As a result, the positioning of the rotary part 6 in the housing 2 is clearly defined.

Figure 14:
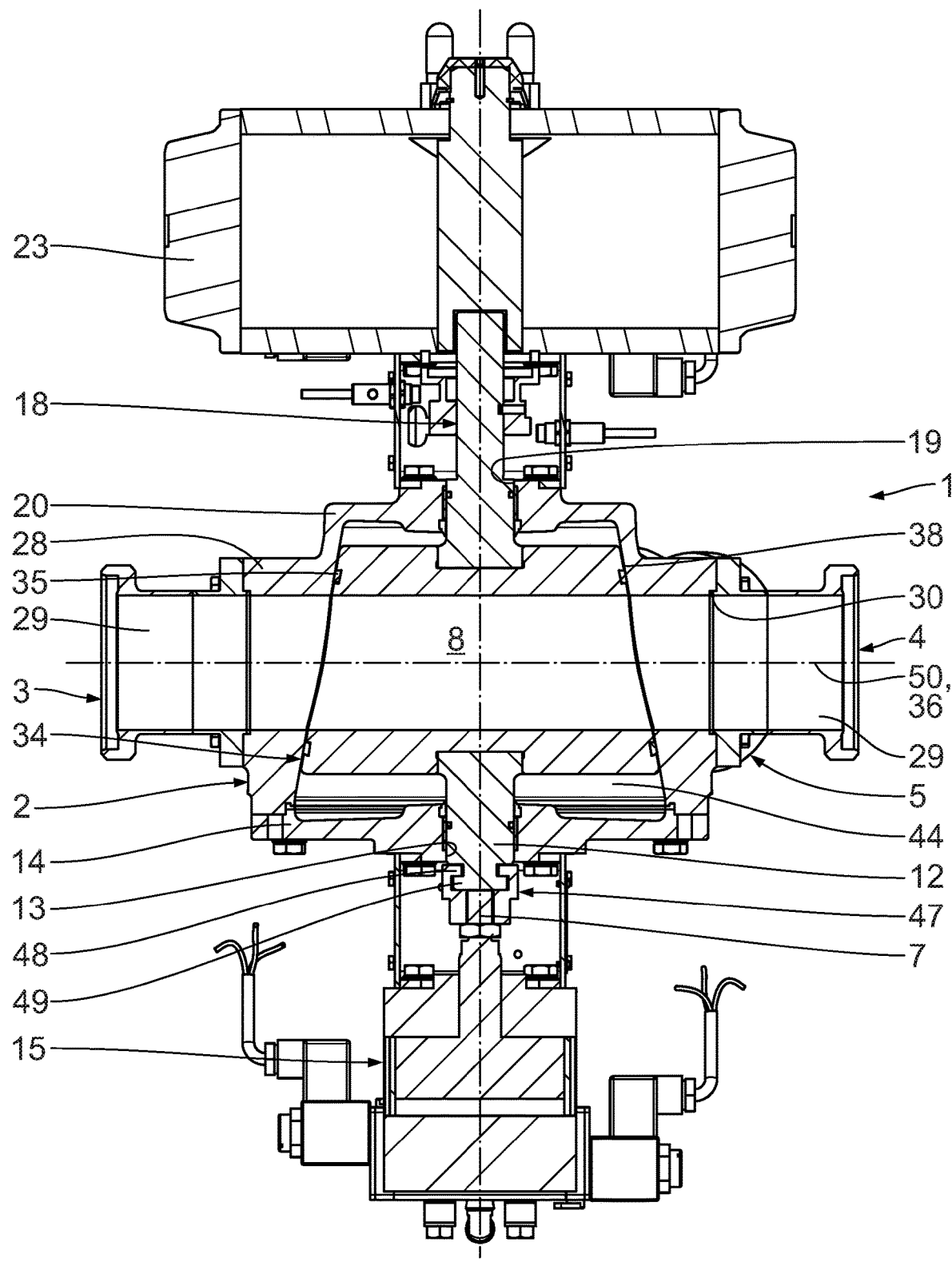
FIG. 14 is a sectional view corresponding to FIG. 11 according to an additional embodiment of the diverter valve, whereas the rotary part features passage conduit sealing elements.
Figure 15:
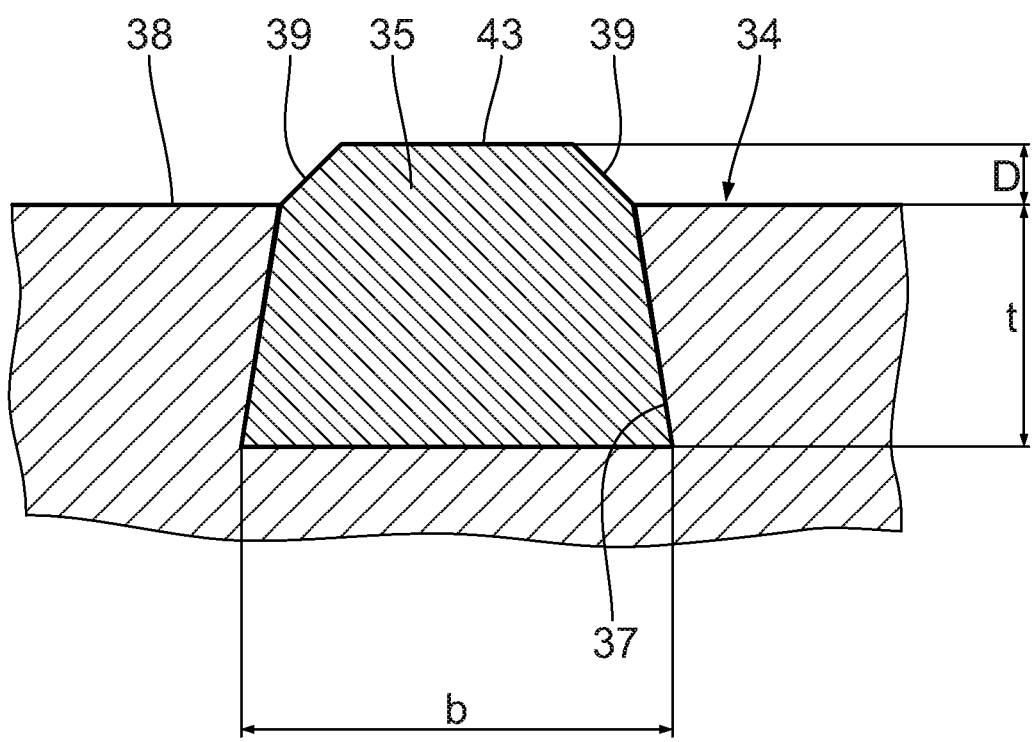
FIG. 15 is an enlarged detailed view of the passage conduit sealing element according to FIG. 14.
Figure 16:
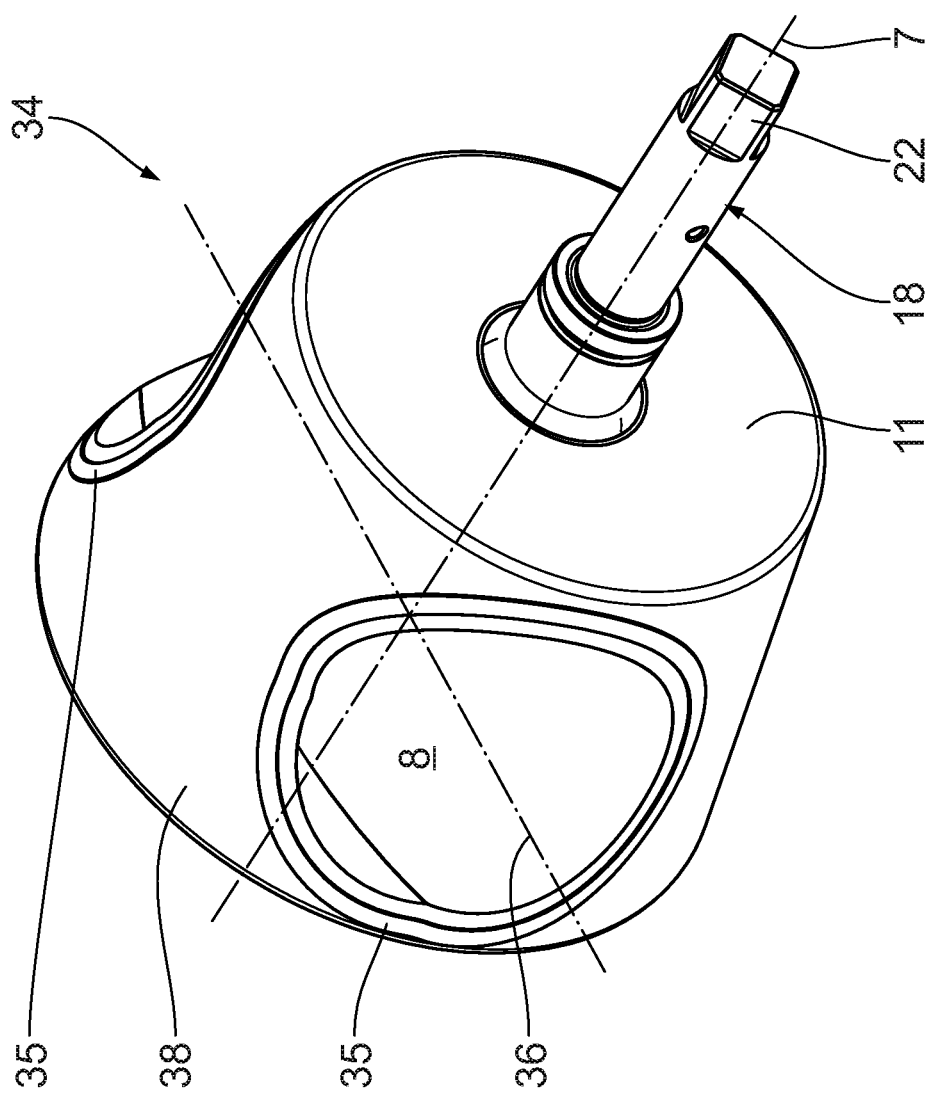
FIG. 16 is a perspective view of a rotary part of the diverter valve according to FIG. 14.

The structure and function of the diverter valve 1 with a seal on the passage conduit 8 will be described in more detail below with reference to FIGS. 14 to 16.

With this additional embodiment of the diverter valve 1, on the rotary part 34, each of the essentially ring-shaped openings of the passage conduit 8 features a circumferential passage conduit sealing element 35. With respect to the passage conduit longitudinal axis 36, the passage conduit sealing elements 35 are arranged circumferentially on the outer contour 9 of the rotary part 34. The arrangement and the positioning of the rotary part 34 in the housing 2 are otherwise essentially unchanged. An essential difference compared to the previous embodiment is that the sealing gap between the outer contour 9 of the rotary part 34 and the inner contour 17 of the housing 2 is enlarged. The radial gap amounts to between 0.1 mm and 2.0 mm, preferably between 0.2 mm and 2.0 mm, more preferably between 0.3 mm and 1.2 mm and most preferably between 0.4 mm and 0.8 mm. To ensure the rotation of the rotary part 34, the rotary part 34 can be axially pulled along the longitudinal axis 7 of the housing 2, at least in areas. It is preferred if the rotary part 34 is rotated in the conveying position in the housing 2.

As with the previous embodiment of the gap seal, the rotary part 34 is rotatably arranged in the housing 2 with the passage conduit sealing elements 35. For a rotation of the rotary part 34 around the axis of rotation 7, it is not necessary to axially displace the rotary part 34 in the housing 2.

Particularly in the design of the passage conduit sealing element 35, it is the case that the circumferential sealing groove 37 is designed to be essentially dovetail-shaped or trapezoidal; that is, the groove width b increases with increasing groove depth t. The dovetail-shaped or trapezoidal contour may be rounded in the corner areas. It is particularly conceivable that only individual or all corner areas are rounded. The flank angle of the dovetail-shaped or trapezoidal contour is greater than 45°, preferably greater than 60°, more preferably greater than 75°, even more preferably greater than 80°, yet more preferably greater than 85°, and in particular greater than 88°. In any event, the flank angle is less than 90°. A flank angle of 90° would mean a rectangular contour of the sealing groove 37.

In the depth direction, the groove width b grows at least in a width direction. Thereby, the passage conduit sealing element 35 is reliably held in the groove 37. The groove width in the area of the surface 38 of the rotary part 34 may be smaller than the width of the passage conduit sealing element 35 in an initial state. The passage conduit sealing element 35 is pre-stressed in the groove 37 on the surface 38 and arranged in a manner clamped in the direction of the groove width.

In order to improve the hold of the passage conduit sealing element 35 in the groove 37, the width of the passage conduit sealing element may also increase as the groove depth t increases. The contour of the section of the passage conduit sealing element 35, which is arranged within the groove 37, is also essentially dovetail-shaped, whereas the width increases at least in one direction in particular. The contour of the section of the passage conduit sealing element 35 arranged in the groove 37 may be essentially identical to the groove cross-section. The maximum width of the passage conduit sealing element 35 is preferably greater than the opening of the groove 37 turned towards the surface 38 of the rotary part 34. The passage conduit sealing element 35 may fill the groove 37 completely. The passage conduit sealing element 35 is arranged in the groove 37 in a manner free of gaps and dead space. The entire surface of the groove 37 is covered by the passage conduit sealing element 35. The passage conduit sealing element 35 rests on the entire inner surface of the groove 37. The passage conduit sealing element 35 is made of an elastomer material.

According to the embodiment shown, the passage conduit sealing element 35 projects out of the groove 37 on the surface 38 of the rotary part 34. As a result, the sealing effect of the passage conduit sealing element 35 is improved. According to the embodiment shown, the projection D with respect to the surface 38 amounts to between 0.5 mm and 1.0 mm. The cross-sectional shape of the passage conduit sealing element 35 is essentially rectangular, whereas the projection section of the passage conduit sealing element 35, which protrudes from the groove 37, has transitional chamfers 39 on the side. The transitional chamfers 39 improve the sealing effect on the rotary part 34. The transitional chamfers 39 enable a continuous transition from the surface 38 of the rotary part 34 to the surface 43 of the passage conduit sealing element 35.

In order to rinse the diverter valve 1 with passage conduit sealing elements 35, as with the previous embodiment, the rotary part 34 is axially displaced within the housing 2 until the rinsing gap is present. Since the passage conduit sealing elements 35 project at the outer contour 9 of the rotary part 34, with this embodiment, the rinsing gap is defined as the distance between the inner contour 17 of the housing 2 and the passage conduit sealing elements 35. For this embodiment, the rinsing gap that is so defined is identical with the rinsing gap of the diverter valve 1 with a gap seal.

Via the drain opening 24, the rinse water can escape from the housing 2 of the diverter valve 1.

Figure 17:
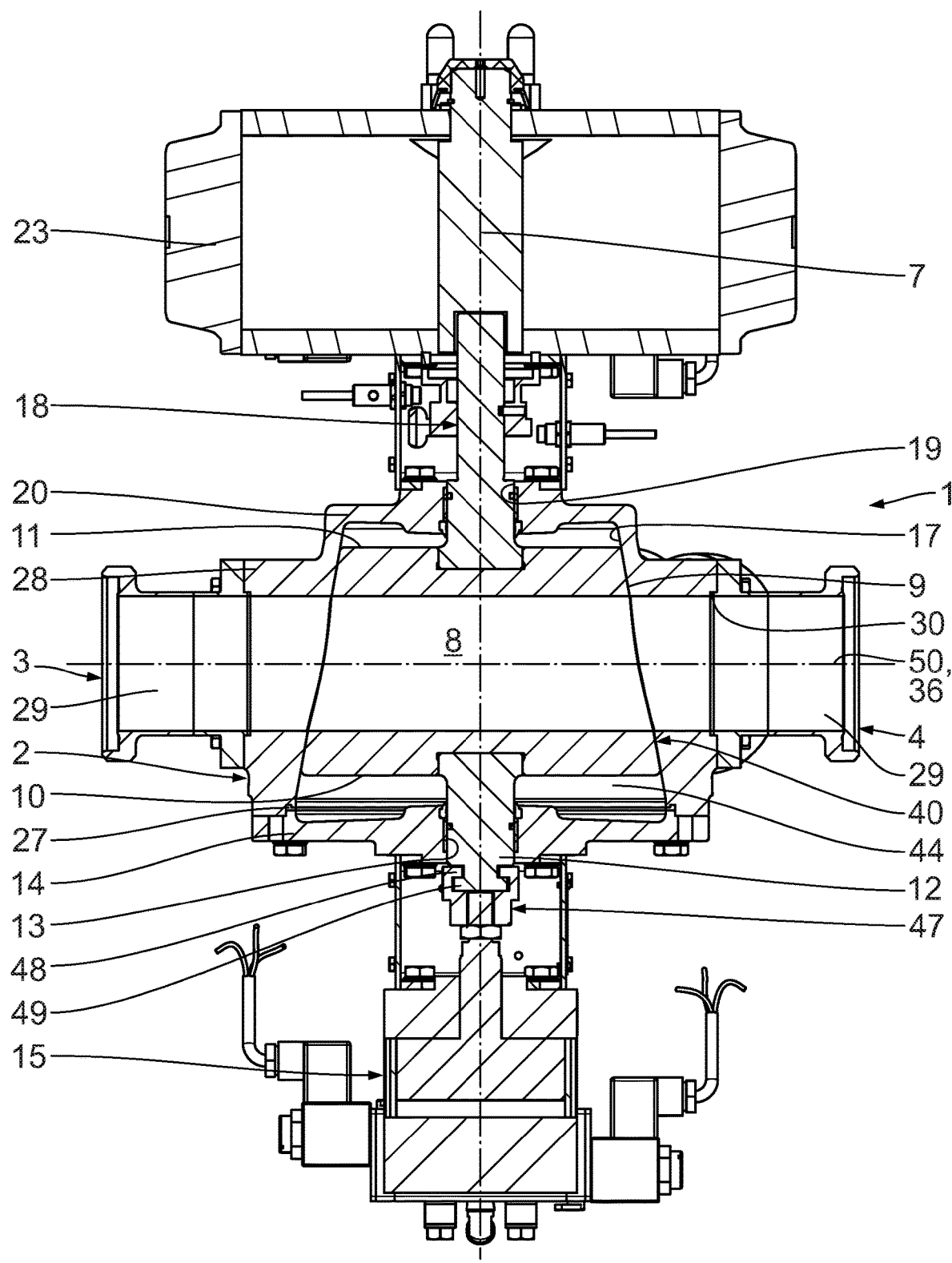
FIG. 17 is a view of a diverter valve corresponding to FIG. 11 according to an additional embodiment, with which the rotary part rests, with its outer contour, directly on an inner contour of the housing.

The structure and function of an additional embodiment of a diverter valve without a radial gap are described below with reference to FIG. 17.

With this embodiment of the diverter valve 1, the rotary part 40 is designed without a sealing element in accordance with the embodiment shown. A sealing of the rotary part 40 in the housing 2 is achieved by the fact that the rotary part 40 rests, with the conical outer contour 9, directly on the conical inner contour 17 of the housing 2. It is said that the rotary part 40 is in a direct transition fit connection with the housing 2. In this arrangement, no radial gap is provided, or the radial gap amounts to 0 mm. For this embodiment, it is advantageous if at least one of the adjoining surfaces features a specific surface treatment, and in particular features a surface finish, in particular a specific surface hardness. It is also possible to provide the surfaces of both components, thus the housing 2 and the rotary part 40, with a hardening layer. It is advantageous if the surfaces feature a chromium layer as a hardening layer. It is advantageous if only the surface of the rotary part 40 is designed with the chromium layer.

It is conceivable, in addition to the transition fit arrangement on the outer contour of the rotary part 40, to provide a cone sealing element 16 in the form of an O-ring.

For rotating the diverter valve, in which the rotary part 40 is in a direct transition fit with the housing, it is necessary to decouple the rotary part 40 from the housing 2. This can take place, for example, by a relatively small axial adjustment of a few tenths of a millimeter to a few millimeters. The small axial adjustment of the rotary part 40 can be effected in that the pneumatic lifting drive (i.e., the axial drive 15) is depressurized. By means of a plate spring (not shown), which is installed in a pre-stressed state, the rotary part 40 is lifted from the cone inner contour 17 of the housing 2.

In the raised arrangement the rotary part 40 can be rotated, for example, between the straight-through orientation and the angled orientation.

In this arrangement, however, the rotary part 40 can also be rotated around the axis of rotation 7 in order to scrape and discharge product deposits that may be present. For the actual rinsing, the rotary part 40 is further pulled away from its conveying position within the housing 2 along the axis of rotation 7 until a larger, defined rinsing gap is formed.

A further axial adjustment is carried out by the axial drive 15, in which this activated (i.e., actuated).

Instead of the pre-stressed plate spring, it is also possible to use two pneumatic cylinders connected in a series as the axial drive 15.

The axial displacement of the rotary part 40 may also take place in one stage, eliminating a relief element when the axial drive 15 is depressurized. The rotation and cleaning of the rotary part 40 is then carried out in a maximum axially displaced state; i.e., in the rinsing configuration.

Figure 18:
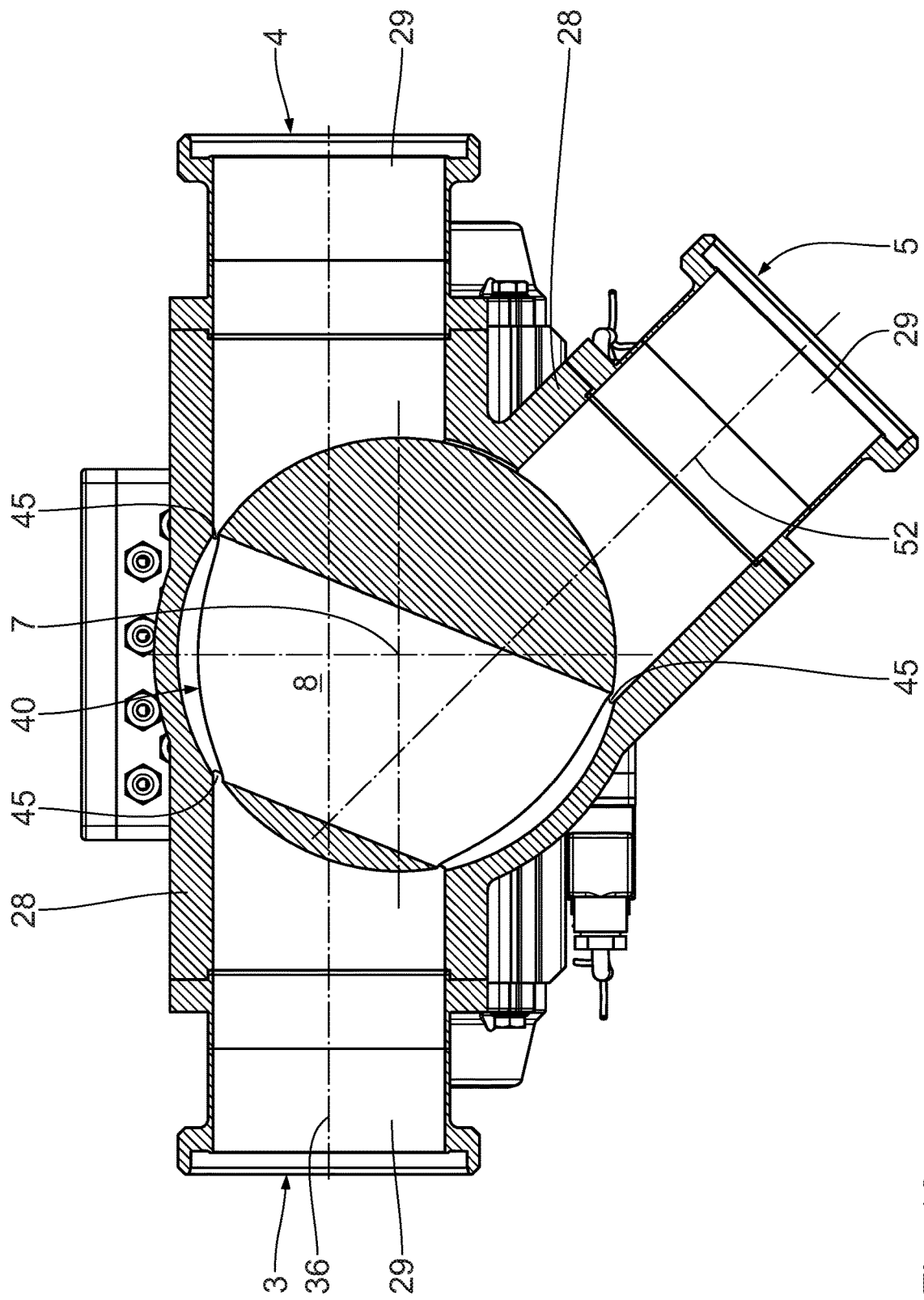
FIG. 18 is a sectional view of a diverter valve corresponding to FIG. 2 with the rotary part in a rotary intermediate position for cleaning with a large axial gap in a CIP rinsing position.

The function, in particular the rinsing, of a diverter valve will be described below in more detail with reference to FIG. 18. As shown in FIG. 18, the rotary part 40 is in the axially displaced state. In addition, the rotary part 40 is rotated around the longitudinal axis 7; thus, it is located neither in the straight-through orientation nor in the angled orientation, but is located in a rinsing rotational position, in which the passage conduit 8 is turned towards none of the passage openings 3, 4, 5. The first passage opening 3 and the pipe section connected thereto are largely blocked by the rotary part 40. Rinse water, which is pressed into the side cover area due to the gap, flows vigorously through such side cover area. The rinse water is subsequently rinsed through additional gaps into one of the draining pipe sections, which are connected to the passage openings 4 and/or 5. It is advantageous that the rotary drive 23 of the diverter valve 1 enables the rinsing position of the rotary part 40 with a third center position.

In addition, cleaning liquid can emerge at the drain opening 24, in order to better rinse the side area between the housing 2 and the rotary part 6, or between the cover 14 and the rotary part 6.

At the end of the cleaning process, the rinse water is discharged through the drain opening 24.

For drying the diverter valve, in particular the rotary part 40, the rotary drive 23 can be moved to the middle position shown in FIG. 18. In order to accelerate the drying process, the rotary part can also be moved axially, so that a sufficient turbulence of the flow is generated to safely dry all areas of the diverter valve 1 and the rotary part 40 and to remove larger amounts of the rinse water from possible dead zones.

The structure and function of an additional embodiment of a diverter valve are described below with reference to FIG. 19, in which the drain opening 24 is arranged on the housing bottom 20. Such a diverter valve 1 can be used in an installed position, in which the housing cover 14 is designed to be horizontal and is arranged on an upper side of the housing 2. In this arrangement, the housing bottom 20, and in particular the drain opening 24 arranged radially on an outer side, form the lowest point of the housing 2, such that the cleaning liquid, as described above, can automatically run out of the housing 2 due to gravity, without an opening of the housing 2 being required.

Figure 19:
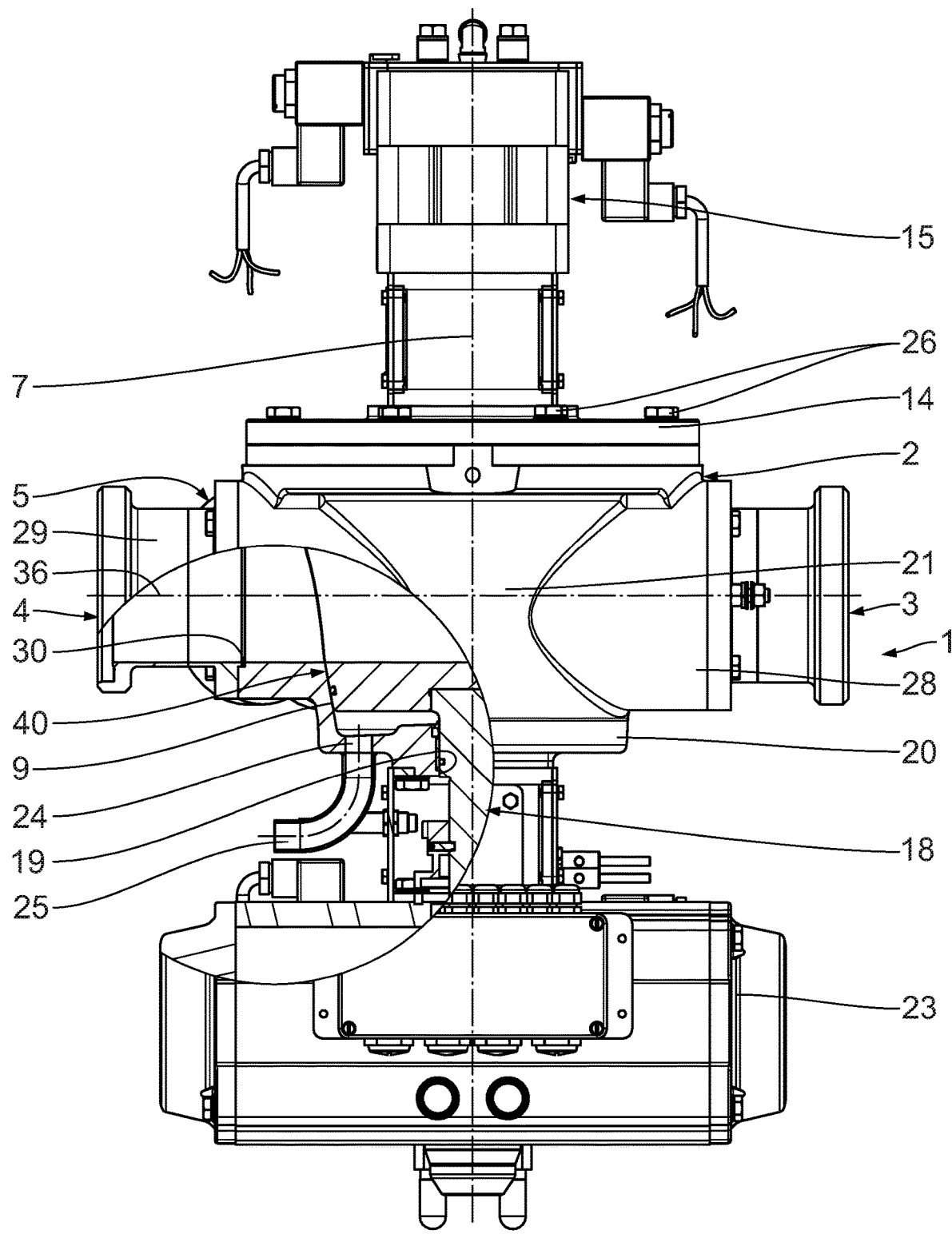
FIG. 19 is a side view of a diverter valve according to an additional embodiment, with which a drain opening is arranged on the housing body.

As shown in FIG. 19, the housing bottom 20 is inclined toward the drain opening 24. The drain opening 24 has a radial distance with respect to the axis of rotation 7 such that the drain opening is arranged in the area of the outer circumference of the housing bottom 20. It is also conceivable to arrange the drain opening 24 with a smaller radial distance on the housing bottom 20.

It is conceivable that the housing bottom 20 is designed to be flat. It is conceivable that a drainage channel is integrated in the housing bottom 20; such channel is designed, according to the sectional view in FIG. 19, to be essentially v-shaped or u-shaped and is designed with a slope down to the drain opening 24. As a result, rinsing liquid can be selectively and reliably discharged to the drain opening 24. The shape of the housing bottom 20 depends, in particular, on the installation position of the diverter valve 1.

Figure 20:
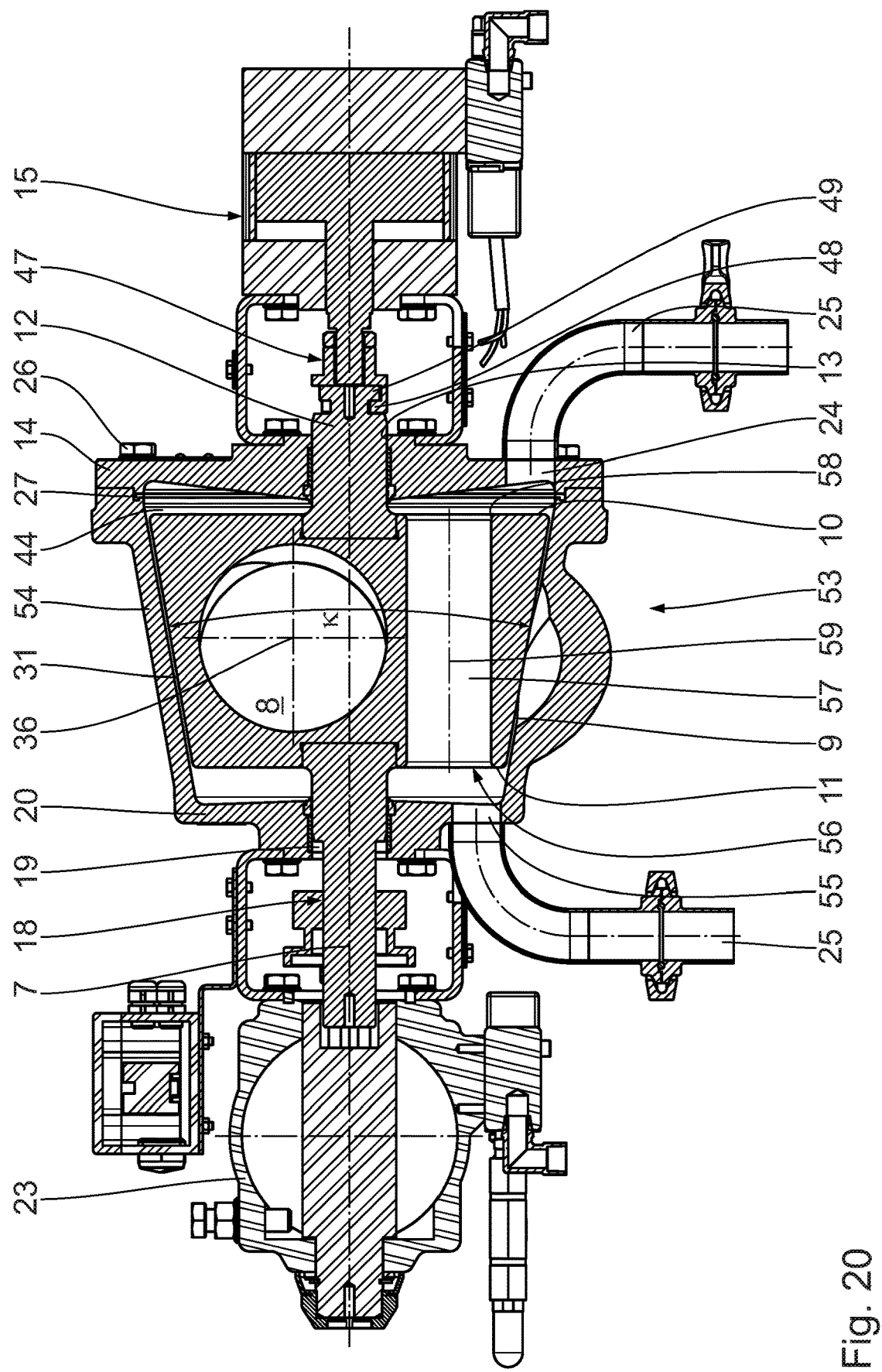
FIG. 20 is a sectional view of a diverter valve corresponding to FIG. 11 according to an additional embodiment with two drain openings and a rotary part with an aperture.
Figure 21:
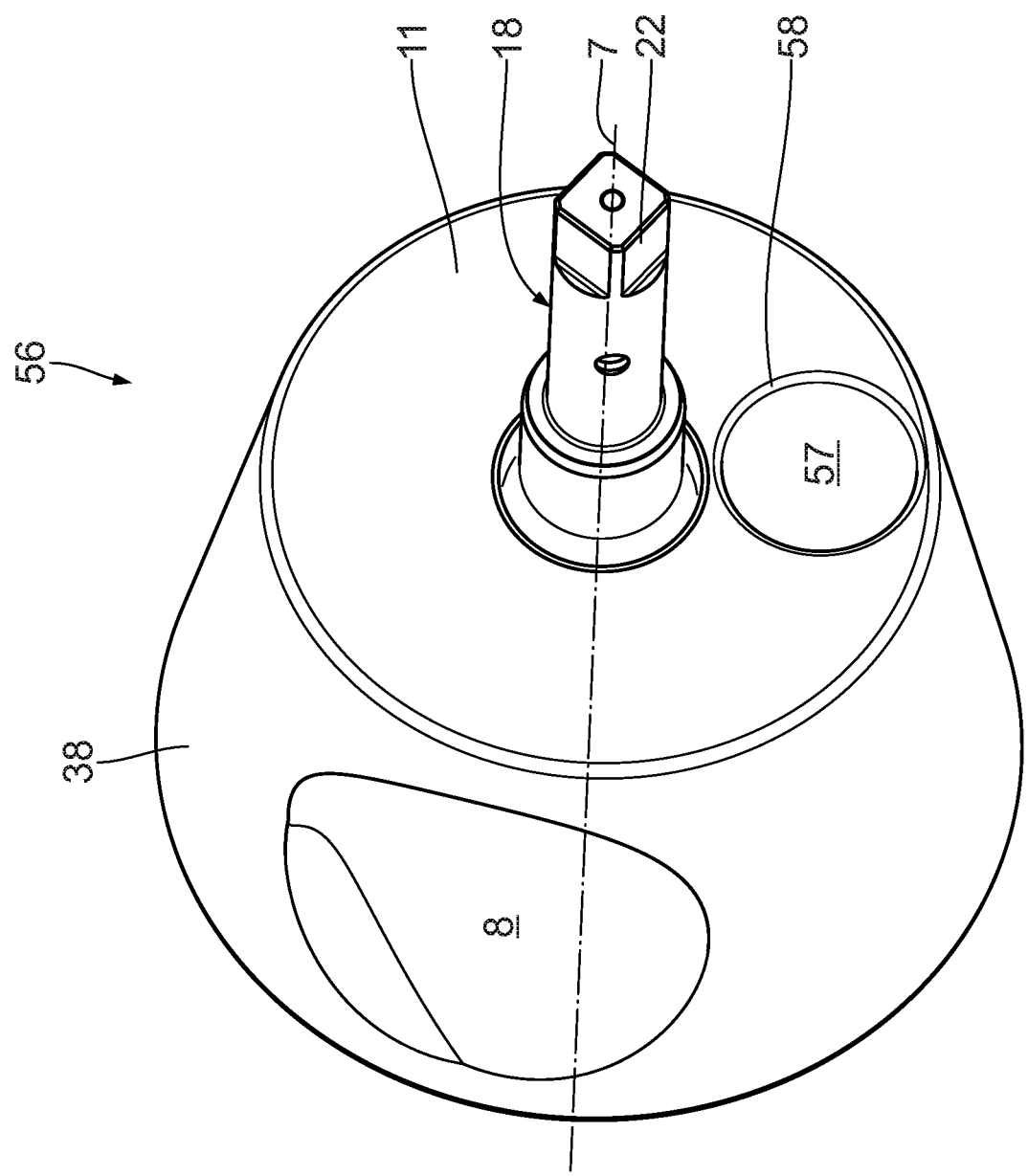
FIG. 21 is an enlarged, perspective view of the rotary part in accordance with FIG. 20.
Figure 22:
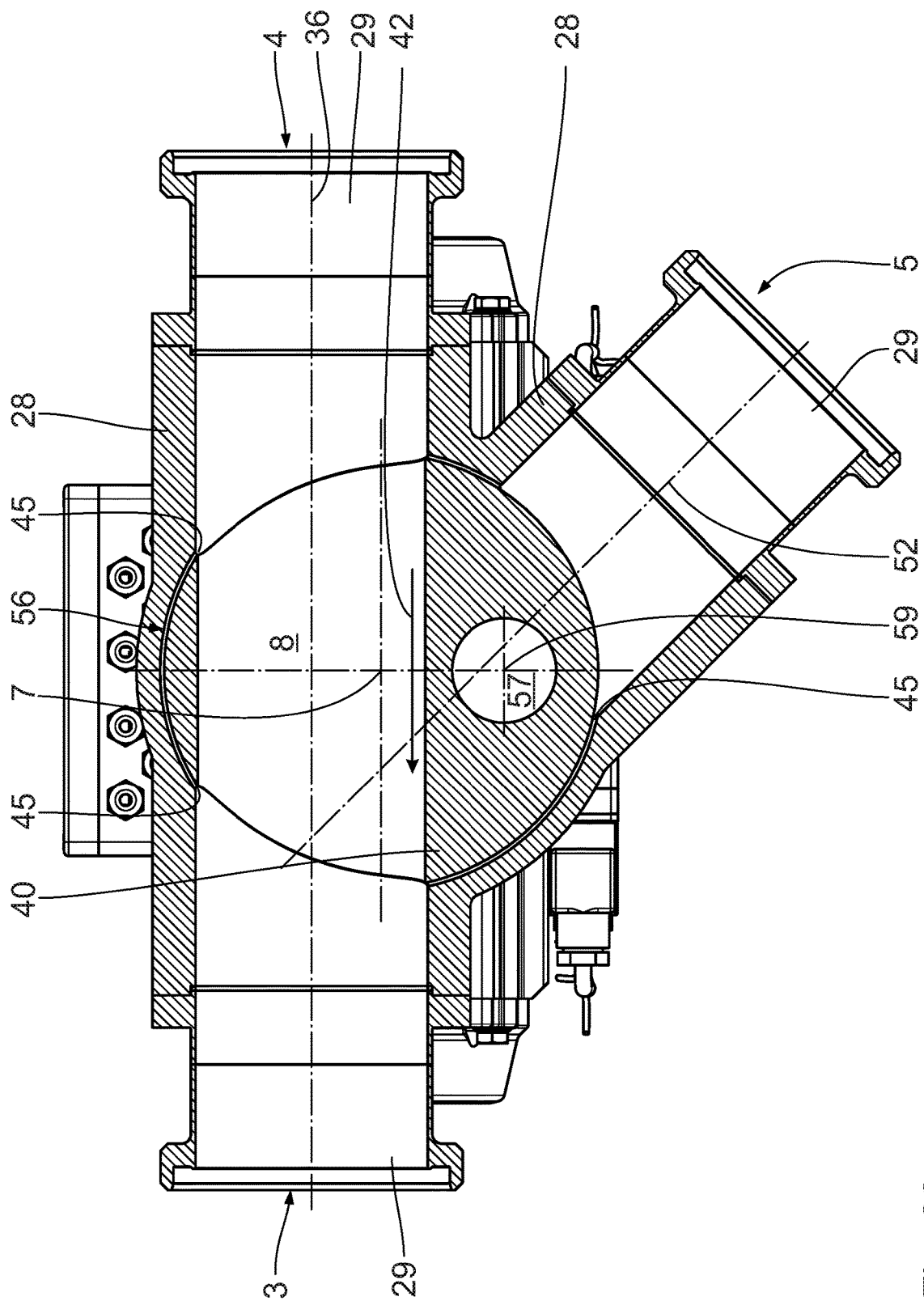
FIG. 22 is an additional sectional view of the diverter valve in accordance with FIG. 20.

An additional embodiment of a diverter valve is described below with reference to FIGS. 20 to 22.

The diverter valve 53 differs from the previous diverter valves in that a second drain opening 55 is provided on the housing 54, and an aperture 57 is provide on the rotary part 40. The diverter valve 53 may also be designed with only one drain opening 24 and an aperture 57 in the rotary part 40. The diverter valve 53 may also be designed with the two drain openings 24, 55, but without an aperture 57. The provision of the second drain opening 55 is possible regardless of whether the aperture 57 is provided on the rotary part 40.

The second drain opening 55 is arranged on the base side of the housing 54. The second drain opening 55 is arranged in the housing bottom 20. The first drain opening 24 is arranged on the housing cover 14, in particular in a radial outer area of the housing cover 14. The first drain opening 24 is arranged at a lowest point of the housing.

The rotary part 56 essentially corresponds to the rotary part 40 according to the previous embodiment, whereas an aperture 57 is additionally provided. The aperture 57 is designed essentially in cylindrical form and has bevels 58 at the transitions turned towards the front surfaces 10, 11 of the rotary part 56. The aperture 57 has an aperture longitudinal axis 59, which is oriented in a manner parallel to the longitudinal axis 7 of the diverter valve 53. The aperture 57 leads to a reduction in the mass of the rotary part. In addition, the rinsing of the diverter valve 53 is improved, in particular in the area of the side surfaces. It is essential that the aperture 57 extends from at least one of the base sides 10, 11 of the rotary part 56. It is also conceivable to provide, instead of the aperture, a recess similar to a blind hole-like, which extends along the aperture longitudinal axis 59, but does not extend all the way through the rotary part 56.

The aperture longitudinal axis 59 can be arranged with an angle of inclination relative to the longitudinal axis 7. This angle of inclination may amount to up to 20°.

The aperture longitudinal axis 59 is oriented, in particular, in a manner perpendicular to the passage conduit longitudinal axis 36. The passage conduit longitudinal axis 36 and the aperture longitudinal axis 59 are oriented in a manner skewed to one another, in such a manner that the passage conduit 8 and the aperture 57 extend into the rotary part 56, separated from one another. The aperture 57 is integrated into the rotary part 56, in a manner spaced from the passage conduit 8. The passage conduit 8 and the aperture 57 are not interconnected. The aperture 57 is a relief hole.

During the cleaning of the diverter valve 53 with a liquid, the aperture 57 makes it possible to improve the cleaning result. As soon as liquid, in particular water, exits via one of the lateral drain openings of the aperture 57, the base sides of the rotary part 56 are better flushed.

Figure 23:
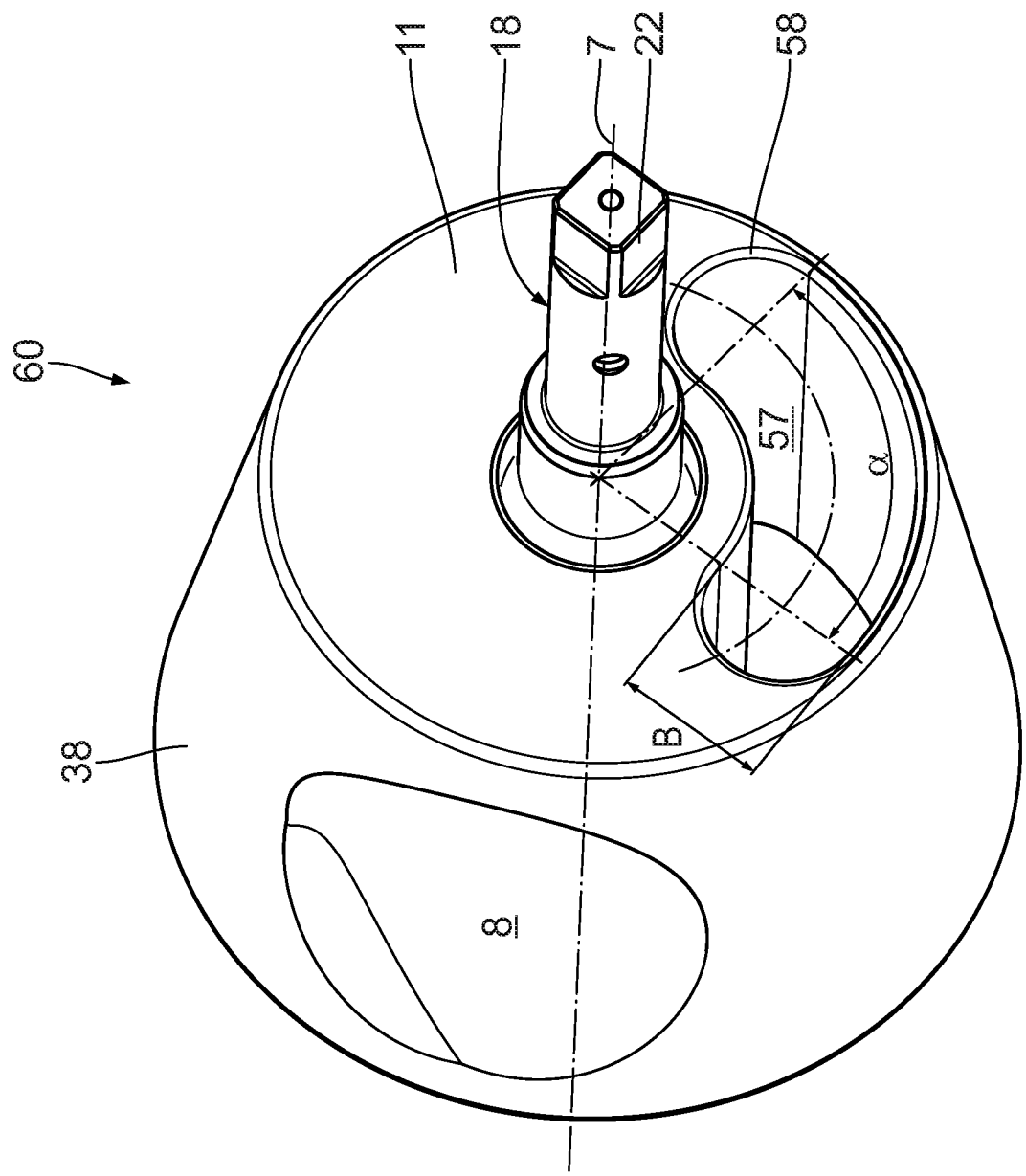
FIG. 23 is a view of a rotary part corresponding to FIG. 21 in accordance with an additional embodiment with a kidney-shaped aperture.

An additional embodiment of a rotary part 60 will be described below with reference to FIG. 23. The rotary part 60 essentially corresponds to the rotary part 56, whereas the aperture 57 is formed along a circular arc in a slot shape. According to the embodiment shown, the opening angle α of the circular arc with respect to the longitudinal axis 7 amounts to 90°. The opening angle α can also amount to more than 90° or less than 90°. With the embodiment shown, the slot width B amounts to half of the radius of the smaller base surface 11. The slot width B can be selected to be larger or smaller. It is advantageous if the aperture 57 is as large as possible, in order to reduce the mass of the rotary part 60 as much as possible. With the arrangement of the aperture 57, it must be taken into consideration that the aperture 57 and the passage conduit 8 do not intersect. The stability and rigidity of the rotary part 60 is ensured despite the aperture 57.

Figure 24:
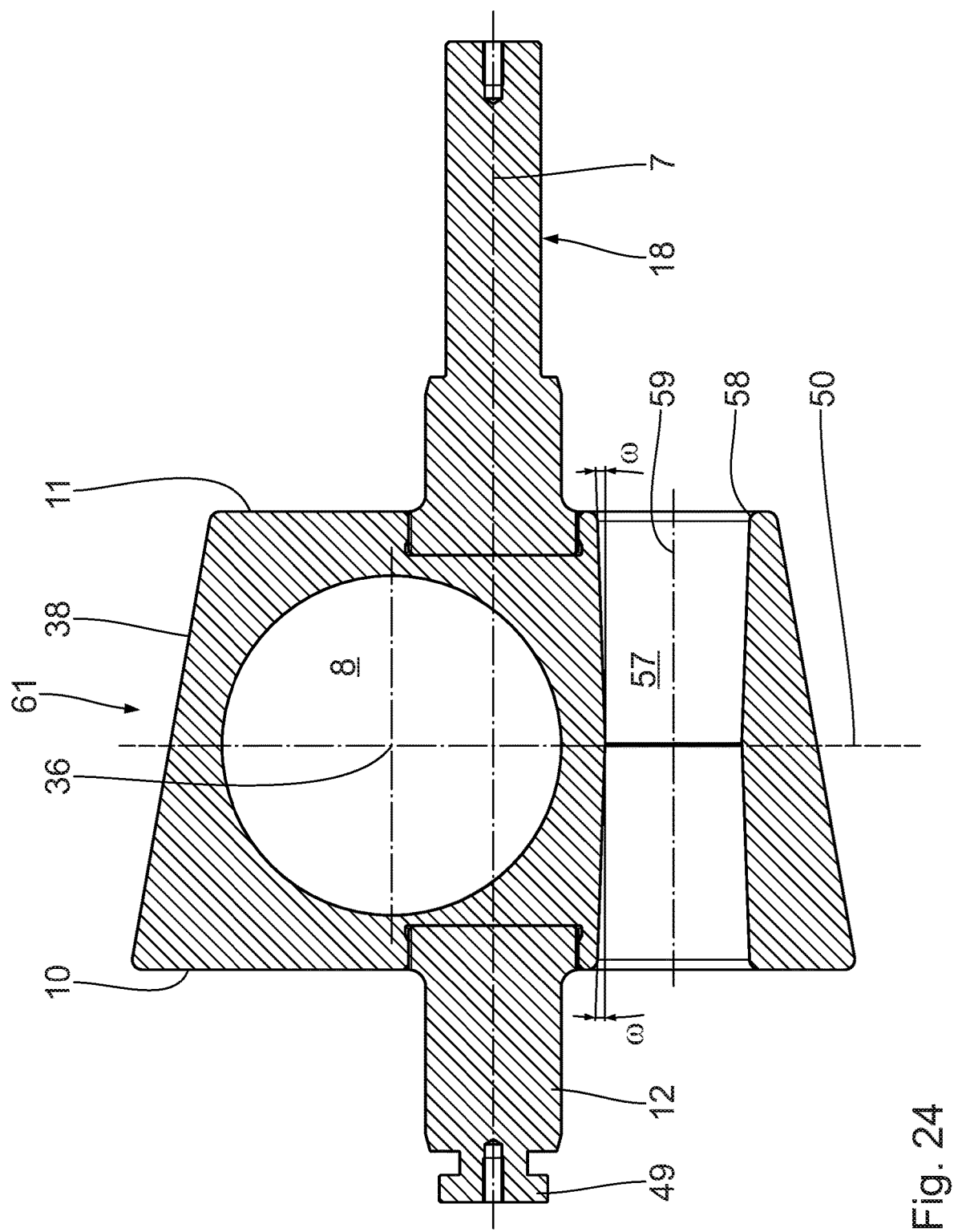
FIG. 24 is a sectional view of a rotary part in accordance with an additional embodiment with a double-conical aperture.

An additional embodiment of a rotary part 61 will be described below with reference to FIG. 24.

The rotary part 61 essentially corresponds to the rotary part 56 according to the previous embodiment. The main difference is that the aperture 57 is double-conical. In each case starting from the openings arranged on the base surfaces 10, 11, the aperture 57 tapers with an aperture cone angle ω. According to the embodiment shown, the aperture cone angle ω amounts to 1°. The aperture cone angle ω can also be selected to be larger or smaller than 1°. It is advantageous if, in the aperture 57, the aperture cone angle ω promotes the automatic drainage of cleaning liquid from the opening to the base surfaces 10, 11.

The double-conical design of the aperture 57 is symmetrical. This means that the cone sections of the aperture 57 meet in the longitudinal center plane 50, in which the passage conduit longitudinal axis 36 is also located. In particular, the two aperture cone angles ω of the cone sections of the aperture 57 are identical. It is also conceivable that the depth of the cone sections of the aperture 57 are different from one another, and meet, in particular, outside the longitudinal center plane 50. The aperture cone angles ω can also be set differently.

Figure 25:
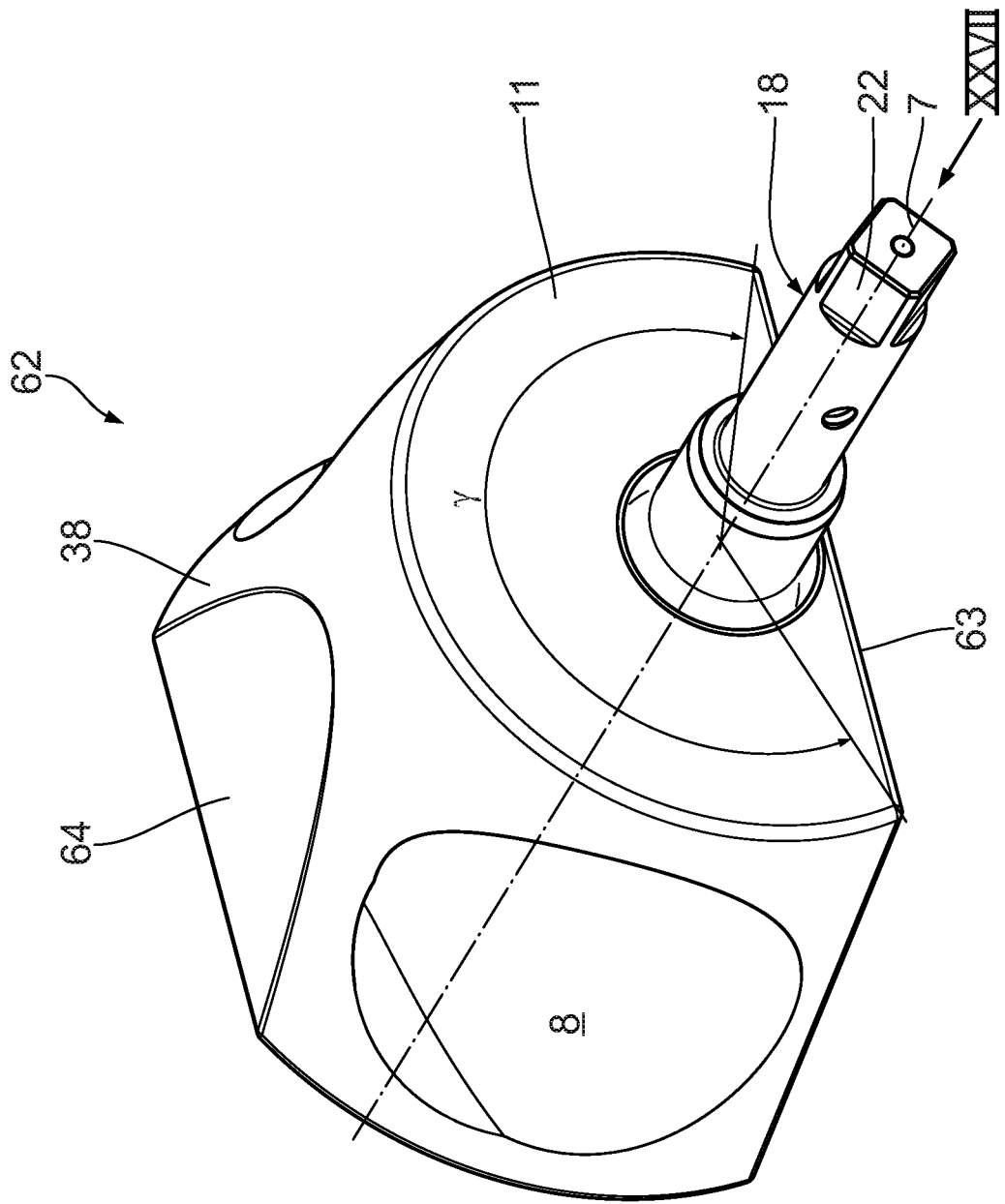
FIG. 25 is a view of a rotary part corresponding to FIG. 23 in accordance with an additional embodiment as a segment component.
Figure 26:
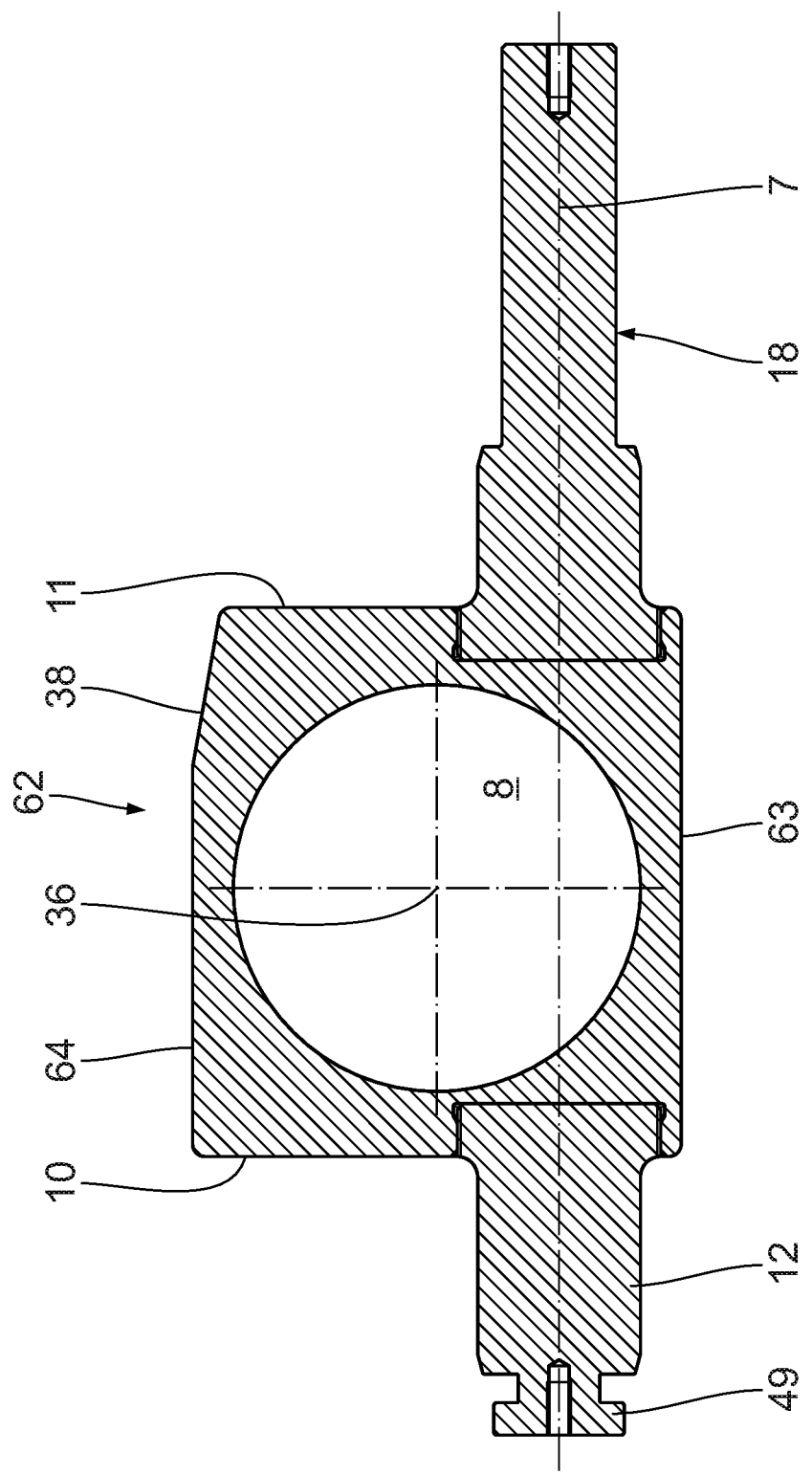
FIG. 26 is a sectional view of the rotary part in accordance with FIG. 25.
Figure 27:
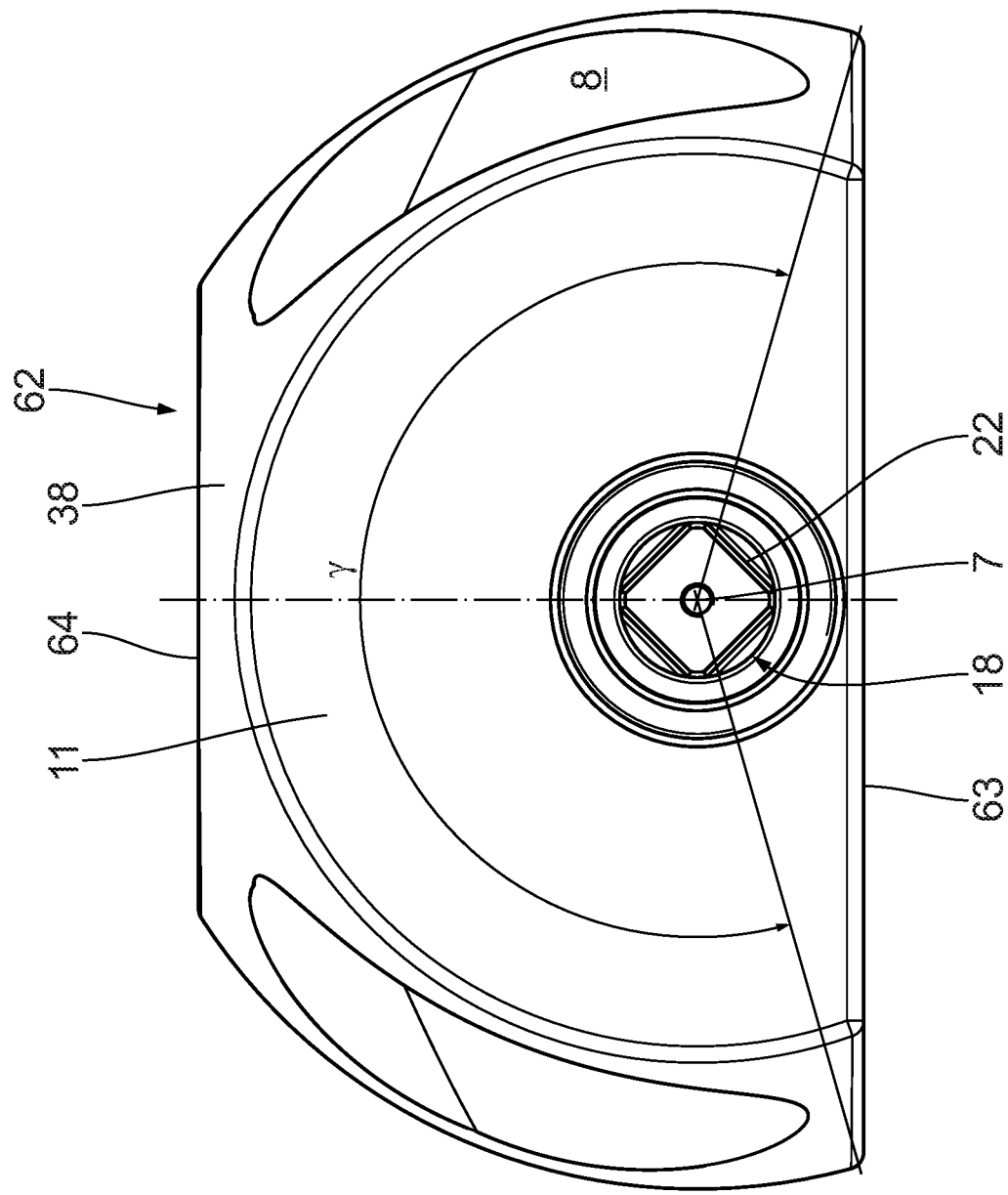
FIG. 27 is a view of the rotary part in FIG. 25 in accordance with arrow XXVII.

An additional embodiment of a rotary part 62 will be described below with reference to FIGS. 25 to 27. The main difference compared to the previous embodiments is that the outer contour 9 of the rotary part 62 is not designed to be fully conical. The outer contour extends over an opening angle γ with respect to the longitudinal axis 7, whereas the opening angle γ is larger than 180°. According to the embodiment shown, the opening angle γ is 200°.

The rotary part 62 corresponds to a segment of a cone. The outer side 63 of the rotary part 62, not visible in FIG. 25, is designed to be flat. The surface opposite to the outer side 63 is straightened in areas. The straightened section 64 is designed to be parallel to the outer side 63.

Figure 28:
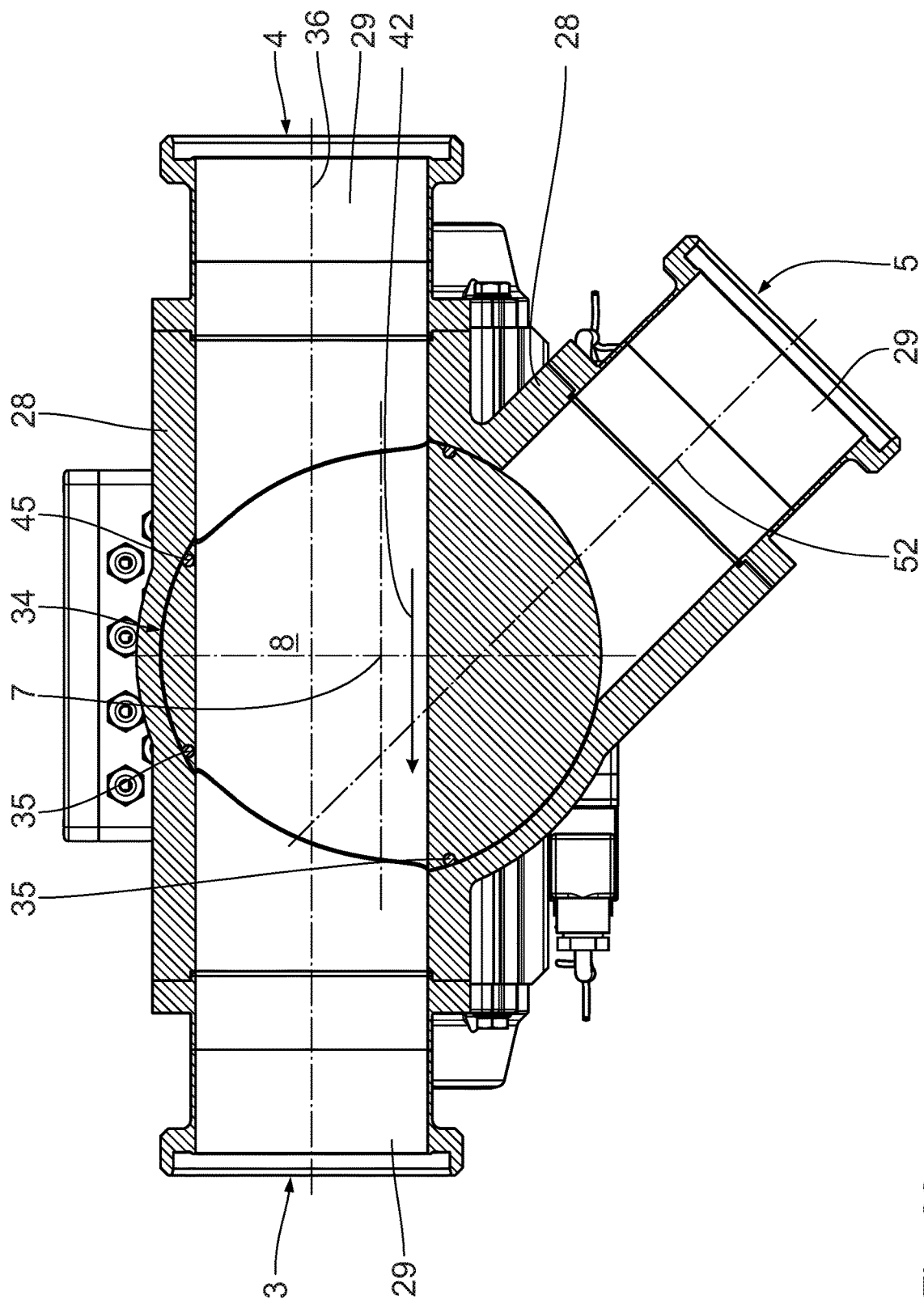
FIG. 28 is a view of a diverter valve corresponding to FIG. 10 in accordance with an additional embodiment with passage conduit sealing elements in an additional arrangement.
Figure 29:
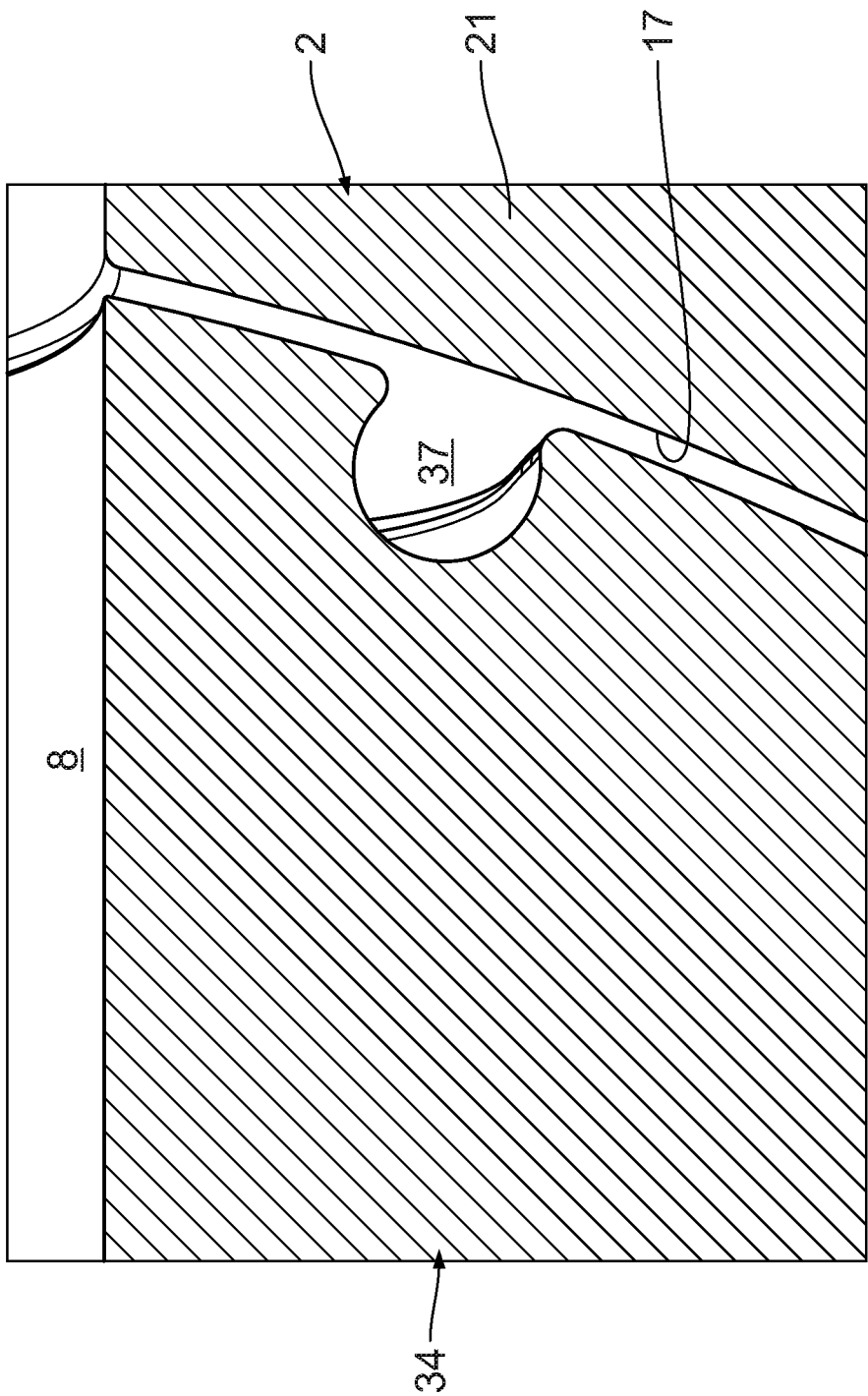
FIG. 29 is an enlarged sectional view of a seal groove of the diverter valve in accordance with FIG. 28.
Figure 30:
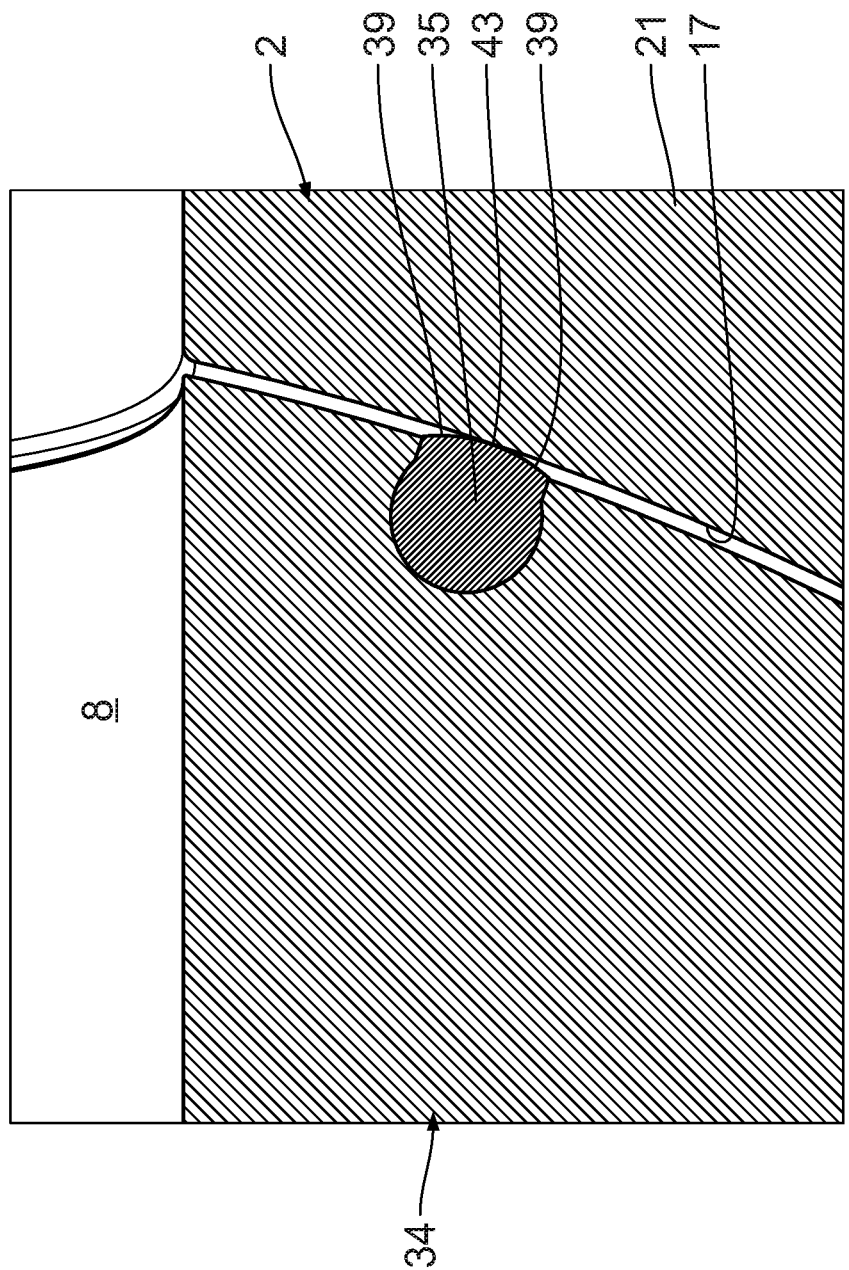
FIG. 30 is an enlarged sectional view in accordance with FIG. 29 with an inserted passage conduit sealing element.

An additional embodiment of a diverter valve is described below with reference to FIGS. 28 to 30.

With the diverter valve 1, the passage conduit sealing element 35 is designed essentially as an O-ring, which is arranged in a corresponding sealing groove 37. The cross-sectional shape of the passage conduit sealing element 35 and the contour of the seal groove 37 correspond to one another such that the seal groove 37 is completely filled by the passage conduit sealing element 35. Dead spaces are avoided.

The passage conduit sealing element 35 has a projection section comprising two transitional chamfers 39, which meet in an essentially line-shaped surface 43. The line-shaped surface 43 forms a contact edge of the passage conduit sealing element 35 on the inner contour 17 of the housing 2.

Figure 31:
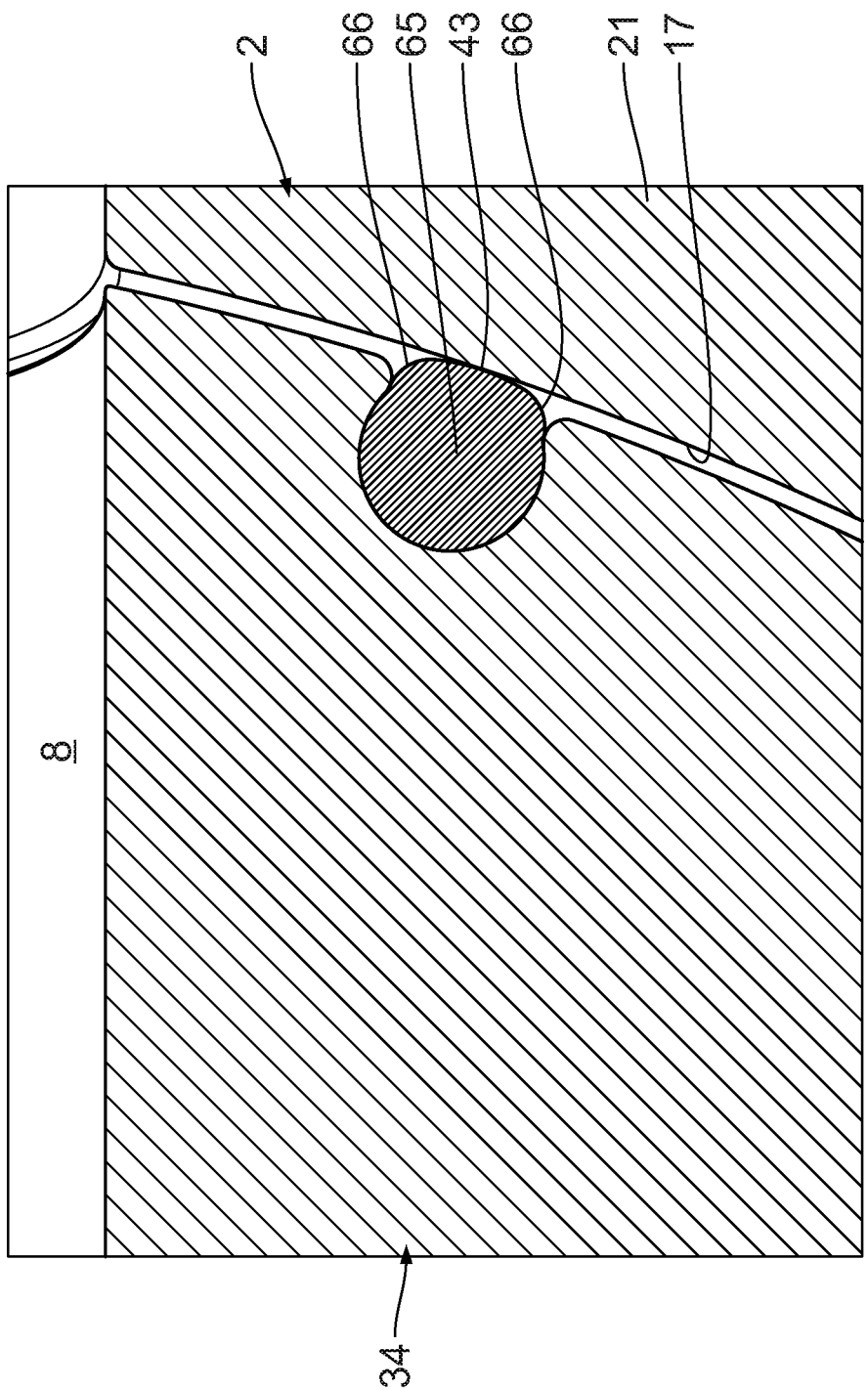
FIG. 31 is a view corresponding to FIG. 30 of an additional embodiment of the passage conduit sealing element.

An additional embodiment of the passage conduit sealing element will be described below with reference to FIG. 31. The passage conduit sealing element 65, like the embodiment according to FIG. 30, is essentially O-ring-shaped. The only difference is that the projection section, instead of the projection chamfers, features projection roundings 66, which show a transition into an essentially flat surface 43. The contact area in the area of the surface 43 of the passage conduit sealing element 65 with the inner contour 17 of the housing 2 is thereby increased.

An additional embodiment of a diverter valve is described below with reference to FIG. 32.

Figure 32:
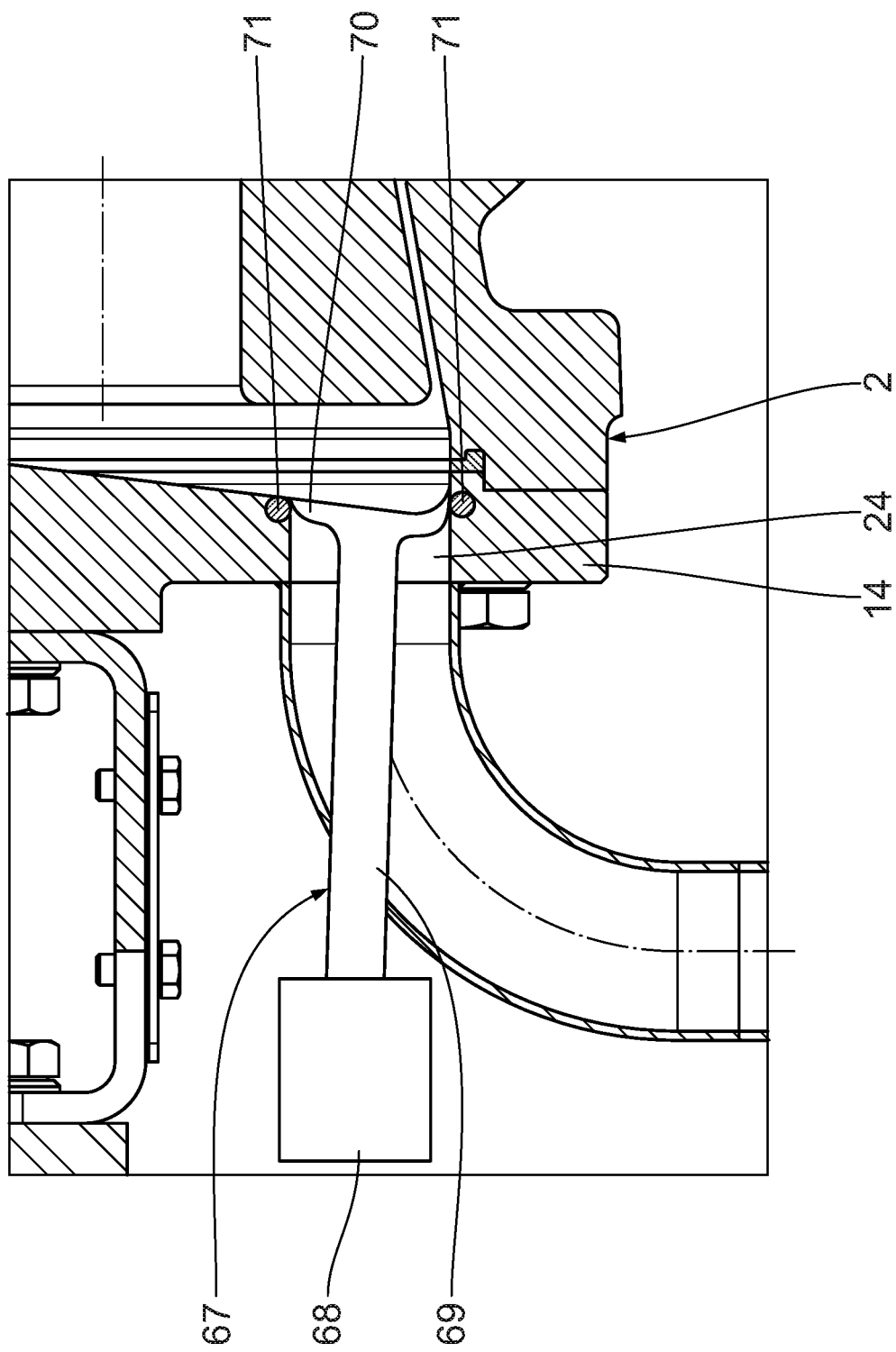
FIG. 32 is a corresponding enlarged sectional view of a diverter valve corresponding to FIG. 20 according to an additional embodiment with a valve body at the drain opening.

The diverter valve, which is shown in FIG. 32 in sections, includes a drain valve with a drain valve body 67, which is designed in the form of a cylinder head valve. With the drain valve, the drain opening 24 can be temporarily opened and closed. The draining of liquid, in particular cleaning liquid, through the drain opening 24 can be controlled by the drain valve. For drying the interior of the diverter valve 1, the drain valve can be opened in order to improve air supply, in particular in the area adjacent to the drain opening 24, to improve drying behavior.

The drain valve body 67 is arranged on the drain opening 24.

The drain valve body 67 ends flush with the inner contour of the housing, in particular with the inner contour of the housing cover 14. This avoids a dead space in which product and/or cleaning liquid from the cleaning cycle is able to collect. It is ensured that the interior of the housing 2 is cleaned without any residue. This avoids residues in the housing 2 of the diverter valve 1.

By means of a drain valve body actuator 68, the drain valve body 67 is displaceable between the closed position shown in FIG. 32 and an open position. The direction of displacement for the drain valve body 67 is oriented transverse and, in particular, perpendicular to the housing cover 14 in the housing 2. The direction of displacement for the drain valve body 67 may be oriented perpendicular to the plane of the drain opening 24. Due to the displacement of the drain valve body 67, the drain opening is freed.

The drain valve body 67 is designed with a valve rod 69 and a valve disk 70 arranged on the front side thereon. The valve plate 70 is connected to the valve rod 69 in one piece. The valve disk 70 is arranged in the closing arrangement according to FIG. 32, in a manner sealed at the drain opening 24. According to the embodiment shown, a drain valve body seal 71, which is designed, according to the embodiment shown, to be integrated as an O-ring on the drain opening 24 in the housing cover 14, serves to seal the drain valve body 67. The drain valve body seal 71 is arranged in a manner fixed to the housing. The drain valve body seal 71 is designed to contact the product.

Figure 33:
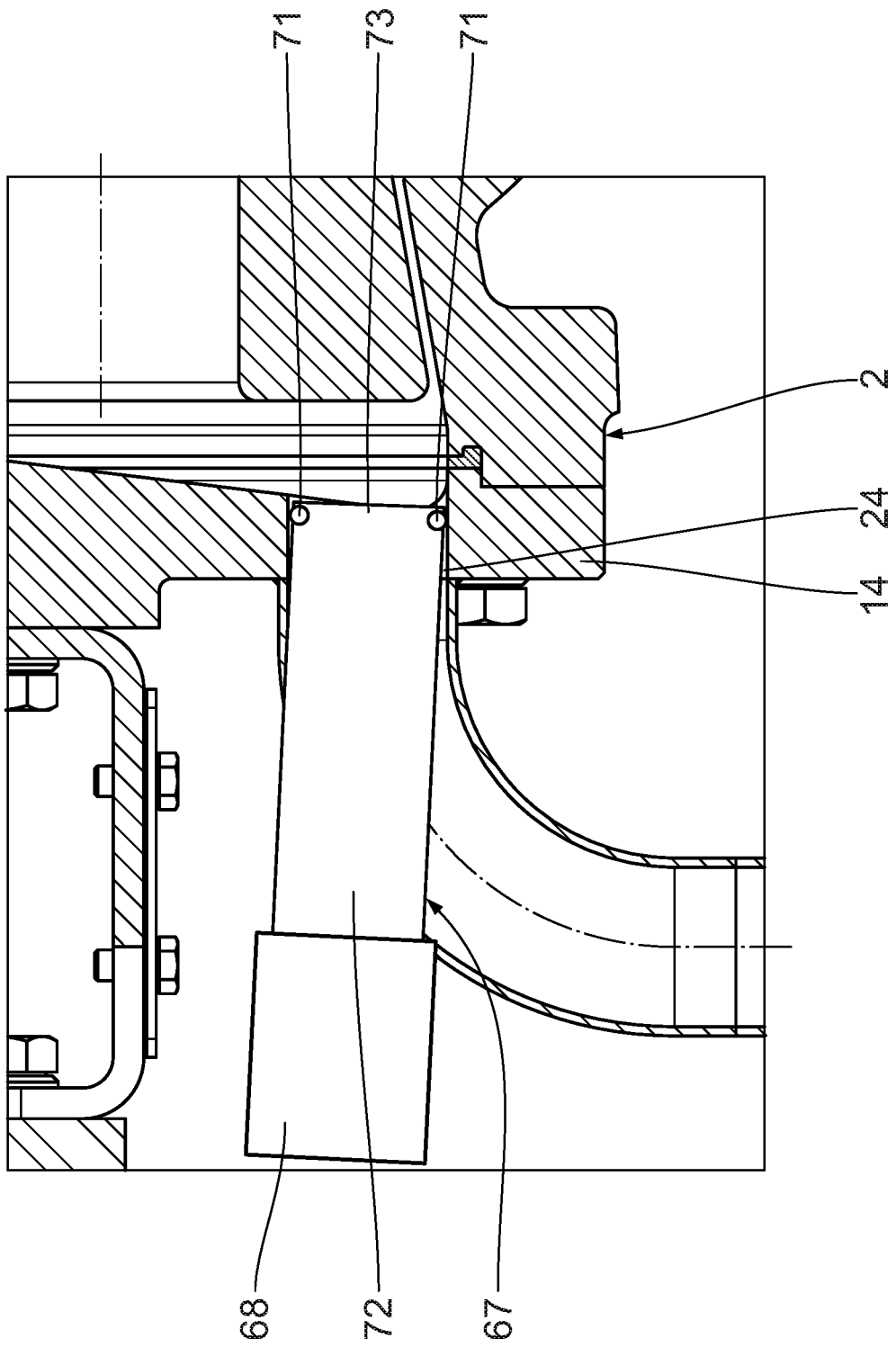
FIGS. 33-35 show additional embodiments of a valve body for the drain opening.

An additional embodiment of a diverter valve 1 will be described below with reference to FIG. 33. In the embodiment, the drain valve body 67 is designed as an obliquely aligned punch. The direction of displacement for the drain valve body 67 is oriented in a manner transverse to the longitudinal axis 7 of the diverter valve. With the drain valve body 67, the punch 72 has an essentially constant thickness, in particular a constant cross-sectional area, along the direction of displacement.

The drain valve body seal 71 is arranged in the area of the front side 73 of the punch 72. The front side 73 is turned towards the interior of the housing 2 of the diverter valve 1. The drain valve body seal 71 may be arranged on the punch 72. With a displacement of the punch 72 for closing and opening the drain opening 24, the drain valve body seal 71 is also displaced. The drain valve body seal 71 is not fixed to the housing; rather, it is mounted in a manner fixed to the drain valve body.

Figure 34:
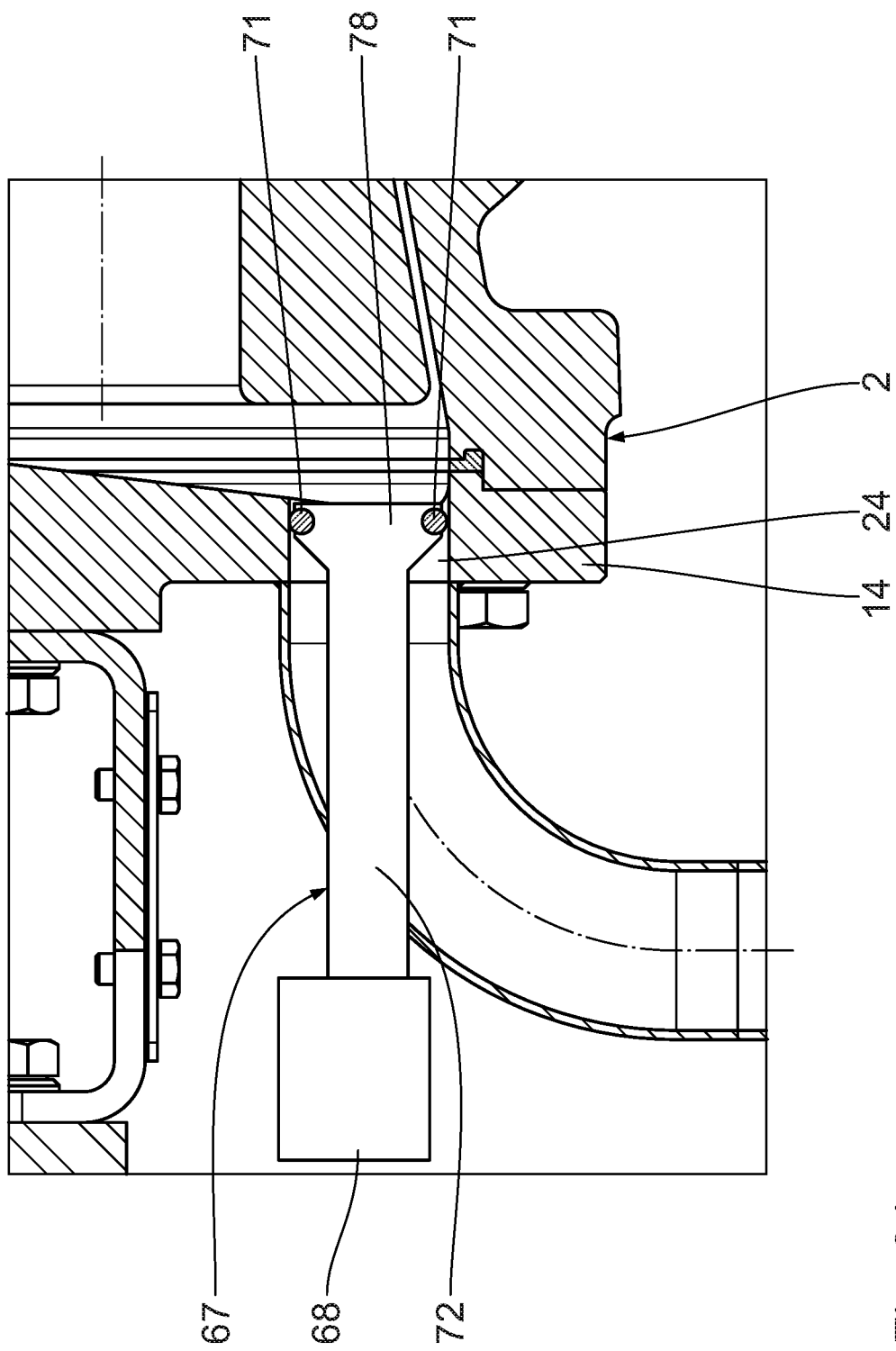

In the following, an additional embodiment of a diverter valve with drain valve body will be described with reference to FIG. 34. The drain valve body 67 corresponds to a punch 72 with a conically shaped head 78. The conicity of the head 78 corresponds to the conicity of the drain opening 24 in the housing cover 14. As with the previous embodiment, the drain valve body seal 71 is attached to the drain valve body 67, in particular to the head 78.

Figure 35:
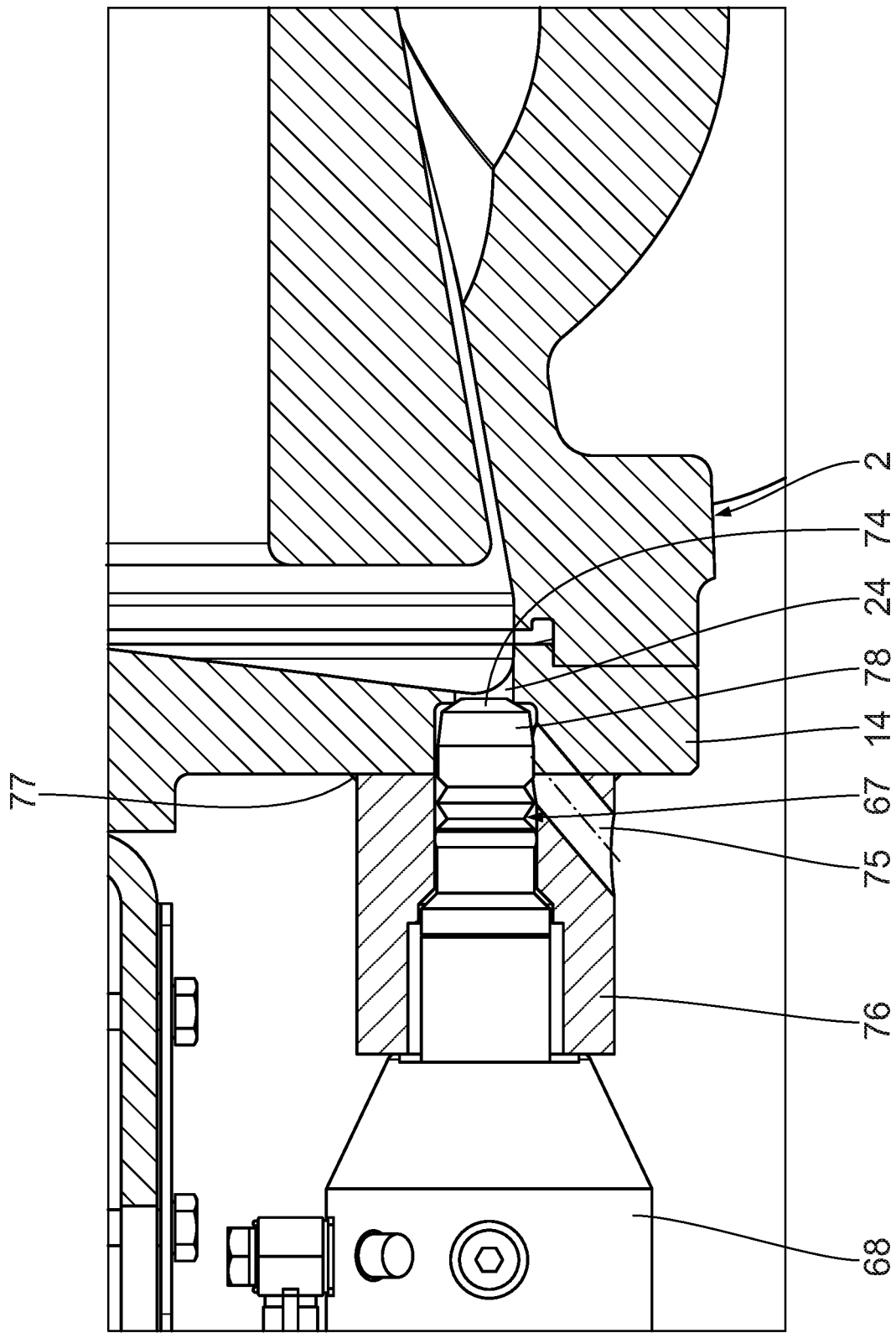

An additional embodiment of a diverter valve with a drain valve body will be described below with reference to FIG. 35. In the embodiment according to FIG. 35, the drain valve body 67 is designed with a head 78, which includes a front cone section 74 turned towards the interior of the housing 2. The cone section 74 enables a sealing arrangement in the drain opening 24 in the housing cover 14 of the housing 2. In the area of the cone section 74, a drain valve body seal 71 can be arranged on the head 78.

According to the embodiment shown, the direction of displacement of the drain valve body 67 is oriented in a manner parallel to the longitudinal axis 7 of the diverter valve 1. At an angle of inclination, a drain line 75 is provided; this serves to drain cleaning liquid from the diverter valve 1. A drain port 25 (not shown) can be connected, for example, to the drain line 75. The drain line 75 is branched out from the drain opening 24 in a direction transverse to the direction of displacement of the drain valve body 67. In order to, on the one hand, enable the connection (which is sealed in particular) of the drain valve body 67 and, on the other hand, to integrate the drain line 75, a connecting body 76 is attached to the housing cover 14 and may be welded by means of a circumferential weld seam 77. The connecting body 76 ensures the guided and precisely positioned arrangement of the drain valve body 67 with respect to the housing cover 14; that is, the drain opening 24. The drain line 75 is also integrated, at least in sections, in the connecting body 76. The connecting body 76 also serves to receive and hold the drain valve body actuator 68.

What is claimed is:

1. A diverter valve, comprising:
   a housing with at least three passage openings for feeding or discharging a material, wherein the passage openings define a conveying plane and wherein at least one of the passage openings forms an inlet opening for a cleaning fluid,
      wherein the housing comprises a housing body with a housing cover connectable therewith,
      wherein a housing cover seal is provided between the housing body and the housing cover, the housing cover seal being freely accessible from an interior of the housing and in contact with the material to be conveyed;
   a rotary part having an axis of rotation and an outer contour that is conical, at least in sections, with respect to the axis of rotation,
      the rotary part being arranged in a sealed manner in the housing while in a conveying position,
      the rotary part being displaceable along the axis of rotation in an axially driven manner between the conveying position and a cleaning position and being rotatable around the axis of rotation in a rotatably driven manner both in the conveying position and in the cleaning position,
      wherein the axis of rotation is oriented perpendicular to the conveying plane, and
      wherein a rinsing gap is formed between the housing and the rotary part when the rotary part is held in the cleaning position;
   a pneumatic, hydraulic, or electric axial drive coupled with the rotary part, wherein the axial drive enables a driven axial displacement of the rotary part in the housing along the axis of rotation;
   a passage conduit arranged in the rotary part which, depending on a rotational position of the rotary part, connects to each other two of the at least three passage openings for conveying the material along the passage conduit through the diverter valve; and
   a drain opening in the housing for automatic drainage of a liquid from the housing,
      wherein the drain opening is arranged on the housing body or on the housing cover, and
      wherein a path for the cleaning fluid is formed from the inlet opening via the rinsing gap to the drain opening when the rotary part is held in the cleaning position.

2. The diverter valve according to claim 1, wherein the drain opening is arranged on a base side of the housing which extends substantially parallel to the conveying plane.

3. The diverter valve according to claim 1, wherein an inner surface of the housing cover and/or an inner surface of the housing body is inclined, at least in areas, towards the drain opening.

4. The diverter valve according to claim 1, wherein the housing cover can be arranged variably on the housing body with respect to a rotational position of the housing cover relative to the axis of rotation.

5. The diverter valve according to claim 1, wherein a cone angle of the outer contour of the rotary part is between 5° and 80°.

6. The diverter valve according to claim 1, wherein a radial gap is formed between the outer contour of the rotary part and an inner contour of the housing, for sealing the rotary part in the housing, the radial gap having an extension between 0.01 mm and 0.5 mm.

7. The diverter valve according to claim 1, wherein the rotary part, with its outer contour, directly rests on an inner contour of the housing.

8. The diverter valve according to claim 1,
further comprising cone sealing elements which are arranged with respect to the axis of rotation circumferentially on the rotary part,
wherein the passage conduit is arranged with respect to the axis of rotation between the cone sealing elements.

9. The diverter valve according to claim 1, further comprising passage conduit sealing elements which are arranged with respect to a passage conduit longitudinal axis circumferentially on the rotary part.

10. The diverter valve according to claim 9, wherein each of the passage conduit sealing elements is held in a respective sealing groove of the rotary part.

11. The diverter valve according to claim 10, wherein the passage conduit sealing elements project beyond the outer contour of the rotary part with a projection section, the projection section having at least one transitional chamfer whereby a flush transition between surfaces of the rotary part and the passage conduit sealing elements is provided.

12. A method for cleaning the diverter valve as in claim 1, comprising:
ending conveyance of the material to be conveyed;
initiating the cleaning;
pulling the rotary part along the axis of rotation axially within the housing by activating the pneumatic, hydraulic, or electric axial drive coupled with the rotary part;
introducing a cleaning liquid through at least one of the passage openings;
rotating the rotary part around the axis of rotation while introducing the cleaning liquid;
ending the introduction of the cleaning liquid;
removing the cleaning liquid from the diverter valve;
drying the diverter valve by introducing hot gas;
ending the drying process; and
continuing conveyance of the material to be conveyed,
wherein a drainage valve arranged in the housing cover is opened only after completion of the cleaning prior to the drying of the diverter valve, in order to allow remaining cleaning liquid to be drained.

13. The method according to claim 12, wherein the rotary part, during introduction of the cleaning liquid, is arranged in a rotational center position such that the outer contour of the rotary part is turned towards one of the at least three passage openings such that the passage conduit is not in alignment with any of the at least three passage openings.

14. The diverter valve according to claim 1, wherein the axial drive is configured to pull the rotary part from the conveying position into the cleaning position when the axial drive is activated.

15. The diverter valve according to claim 1,
wherein the rotary part is operatively connected to a rotary drive by a rotary drive shaft, and
wherein the rotary drive shaft is welded to a base of the rotary part.

16. The diverter valve according to claim 15,
wherein the rotary drive is configured to rotate the rotary part while the cleaning fluid is introduced into the at least one of the passage openings.

17. A diverter valve, comprising:
a housing with at least three passage openings for feeding or discharging a material, wherein the passage openings define a conveying plane and wherein at least one of the passage openings forms an inlet opening for a cleaning fluid;
a rotary part having an axis of rotation and an outer contour that is conical, at least in sections, with respect to the axis of rotation, the rotary part being arranged in a sealed manner in the housing while in a conveying position,
the rotary part being displaceable along the axis of rotation in an axially driven manner between the conveying position and a cleaning position and being rotatable around the axis of rotation in a rotatably driven manner,
wherein the axis of rotation is oriented perpendicular to the conveying plane,
wherein a rinsing gap is formed between the housing and the rotary part when the rotary part is held in the cleaning position,
wherein an adjustable radial gap is formed between the housing and the rotary part when the rotary part is in the conveying position, and
wherein the rotary part comprises an aperture having an aperture longitudinal axis, the aperture having beveled openings on each of two opposite base sides of the rotary part, the aperture extending from one base side of the rotary part to the other, opposing base side of the rotary part;
a passage conduit arranged in the rotary part which, depending on a rotational position of the rotary part, connects to each other two of the at least three passage openings for conveying the material along the passage conduit through the diverter valve; and
a drain opening in the housing for automatic drainage of a liquid from the housing,
wherein a path for the cleaning fluid is formed from the inlet opening via the rinsing gap to the drain opening when the rotary part is held in the cleaning position.

18. The diverter valve according to claim 17, wherein the aperture has a generally cylindrical shape.

19. The diverter valve according to claim 17,
wherein the rotary part is operatively connected to a rotary drive by a rotary drive shaft, and
wherein the rotary drive shaft is welded to a base of the rotary part.

20. The diverter valve according to claim 19,
wherein the rotary drive is configured to rotate the rotary part while the cleaning fluid is introduced into the at least one of the passage openings.

* * * * *